United States Patent
Fukawatase et al.

(10) Patent No.: US 7,793,975 B2
(45) Date of Patent: Sep. 14, 2010

(54) METHOD OF FOLDING PASSENGER-SEAT AIRBAG

(75) Inventors: Osamu Fukawatase, Aichi-ken (JP); Seiji Yamada, Okazaki (JP); Kenichi Takenaka, Chiryu (JP); Shinya Suzuki, Yokohama (JP); Satoru Hirai, Kanagawa-ken (JP)

(73) Assignees: Toyota Jidosha Kabushiki Kaisha, Toyota-shi, Aichi-ken (JP); Kanto Auto Works, Ltd., Yokosuka-shi, Kanagawa-ken (JP)

( * ) Notice: Subject to any disclaimer, the term of this patent is extended or adjusted under 35 U.S.C. 154(b) by 0 days.

(21) Appl. No.: 11/791,827

(22) PCT Filed: Jul. 31, 2006

(86) PCT No.: PCT/IB2006/002140

§ 371 (c)(1),
(2), (4) Date: May 30, 2007

(87) PCT Pub. No.: WO2007/017729

PCT Pub. Date: Feb. 15, 2007

(65) Prior Publication Data

US 2008/0122208 A1    May 29, 2008

(30) Foreign Application Priority Data

Aug. 5, 2005 (JP) .............................. 2005-228892

(51) Int. Cl.
*B60R 21/237* (2006.01)
*B60R 21/231* (2006.01)
*B60R 21/205* (2006.01)

(52) U.S. Cl. .................. 280/743.1; 280/732; 280/730.1

(58) Field of Classification Search .............. 280/743.1, 280/728.1, 732, 729, 730.1; 493/458, 459
See application file for complete search history.

(56) References Cited

U.S. PATENT DOCUMENTS 5,605,350 A * 2/1997 Bates et al. .............. 280/743.1

(Continued)

FOREIGN PATENT DOCUMENTS

EP    0 957 007    11/1999

(Continued)

OTHER PUBLICATIONS

International Search Report.

(Continued)

*Primary Examiner*—Paul N Dickson
*Assistant Examiner*—Keith Frisby
(74) *Attorney, Agent, or Firm*—Finnegan, Henderson, Farabow, Garrett & Dunner, LLP

(57) ABSTRACT

A passenger-seat airbag (32) includes a pair of left and right airbags (44, 46), and a root portion (48) that is connected to both of the left and right airbags (44, 46). When the passenger-seat airbag (32) is provided in a vehicle, an airbag folded portion (62) that forms the left and right airbags (44, 46) is positioned closer to the rear of the vehicle than the root portion (48) is, and a slack portion (49) that forms the root portion (48) is made upright along the airbag folded portion (62), and is positioned closer to the front of the vehicle than the airbag folded portion (62) is. Thus, the slack portion (49) is expanded and deployed toward a windshield earlier to form "a wall". Then, the left and right airbags (44, 46) are stably deployed toward a passenger seat (toward the rear of the vehicle).

15 Claims, 22 Drawing Sheets

U.S. PATENT DOCUMENTS

| | | | |
|---|---|---|---|
| 6,170,857 B1 * | 1/2001 | Okada et al. | 280/728.1 |
| 6,176,509 B1 * | 1/2001 | Kawaguchi et al. | 280/728.1 |
| 6,196,585 B1 | 3/2001 | Igawa | |
| 6,457,744 B1 * | 10/2002 | Tonooka | 280/732 |
| 6,834,886 B2 | 12/2004 | Hasebe et al. | |
| 6,969,086 B2 | 11/2005 | Hasebe et al. | |
| 2002/0084635 A1 | 7/2002 | Tajima et al. | |
| 2002/0149186 A1 | 10/2002 | Halford et al. | |
| 2003/0116947 A1 * | 6/2003 | Yokoyama et al. | 280/730.2 |
| 2004/0160048 A1 | 8/2004 | Hasebe et al. | |
| 2005/0029779 A1 * | 2/2005 | Bito et al. | 280/728.2 |

FOREIGN PATENT DOCUMENTS

| | | |
|---|---|---|
| JP | 6-227353 | 8/1994 |
| JP | 10-338096 | 12/1998 |
| JP | 11-321511 | 11/1999 |
| JP | 2002-187515 | 7/2002 |
| JP | 2002-249009 | 9/2002 |
| JP | 2004-34989 | 2/2004 |
| JP | 2004-256016 | 9/2004 |
| JP | 2004-268903 | 9/2004 |
| JP | 2004-314933 | 11/2004 |

OTHER PUBLICATIONS

Written Opinion of the ISR.

Japanese Office Action dated Apr. 21, 2008.

* cited by examiner

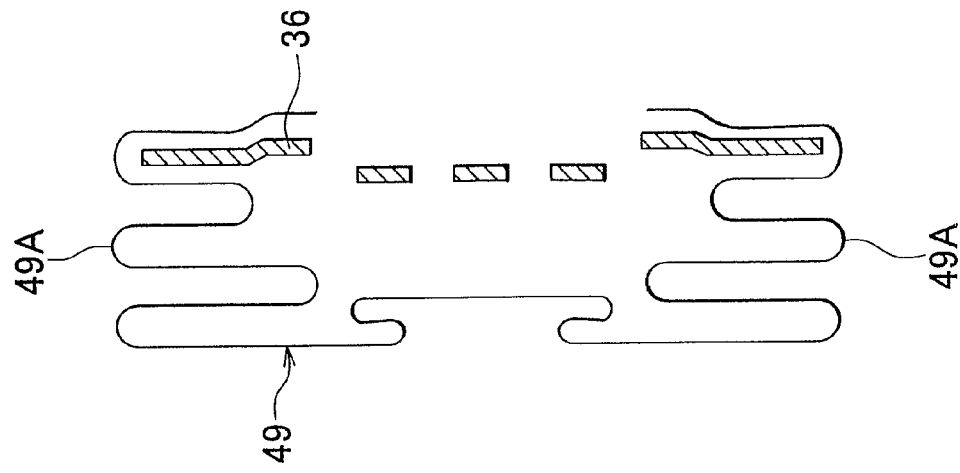
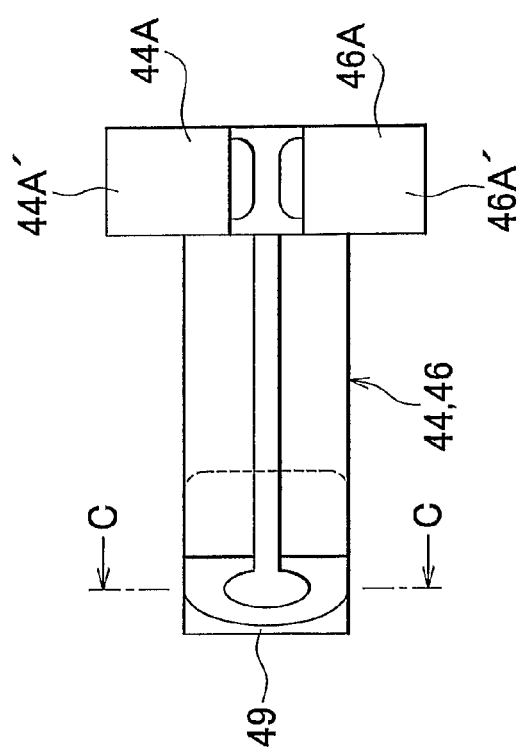
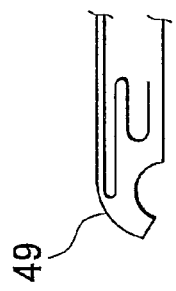
FIG. 5C
FIG. 5A
FIG. 5B 44,46

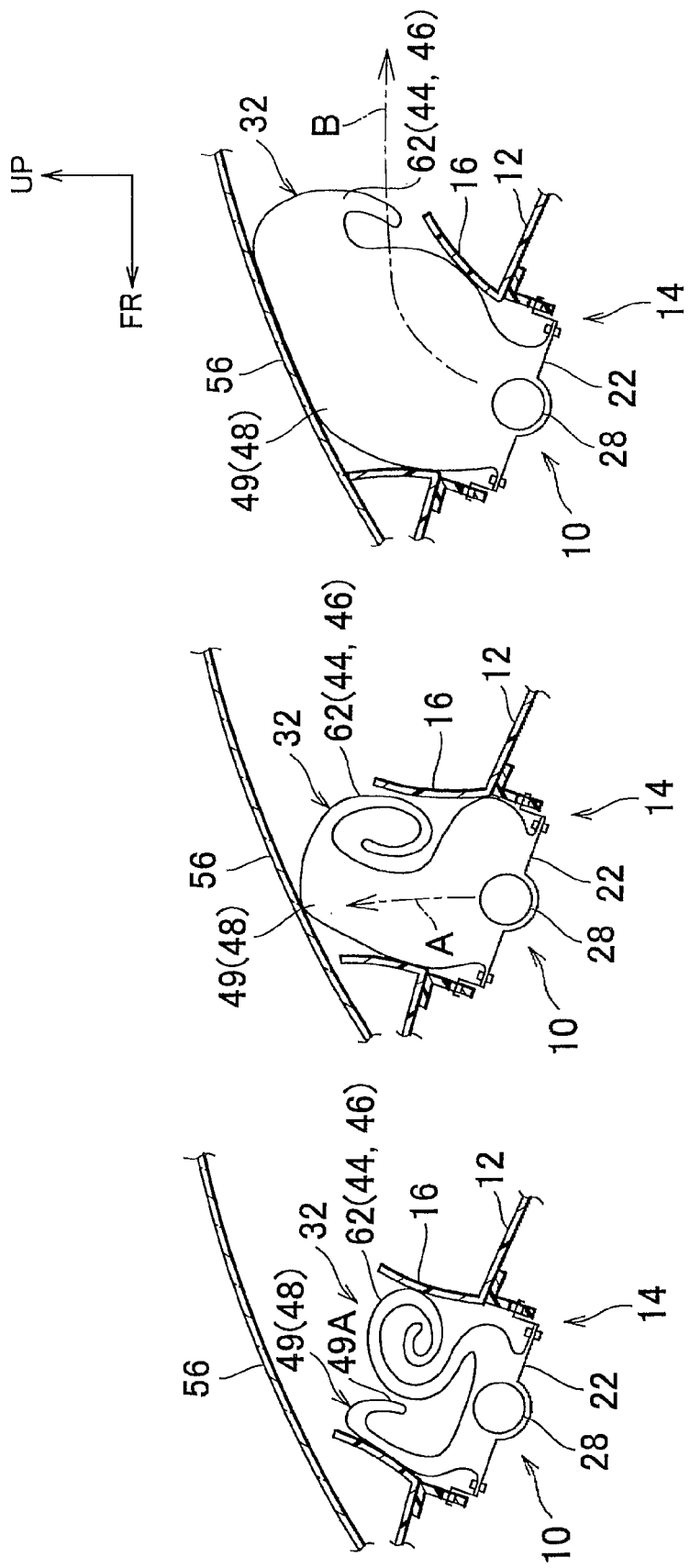

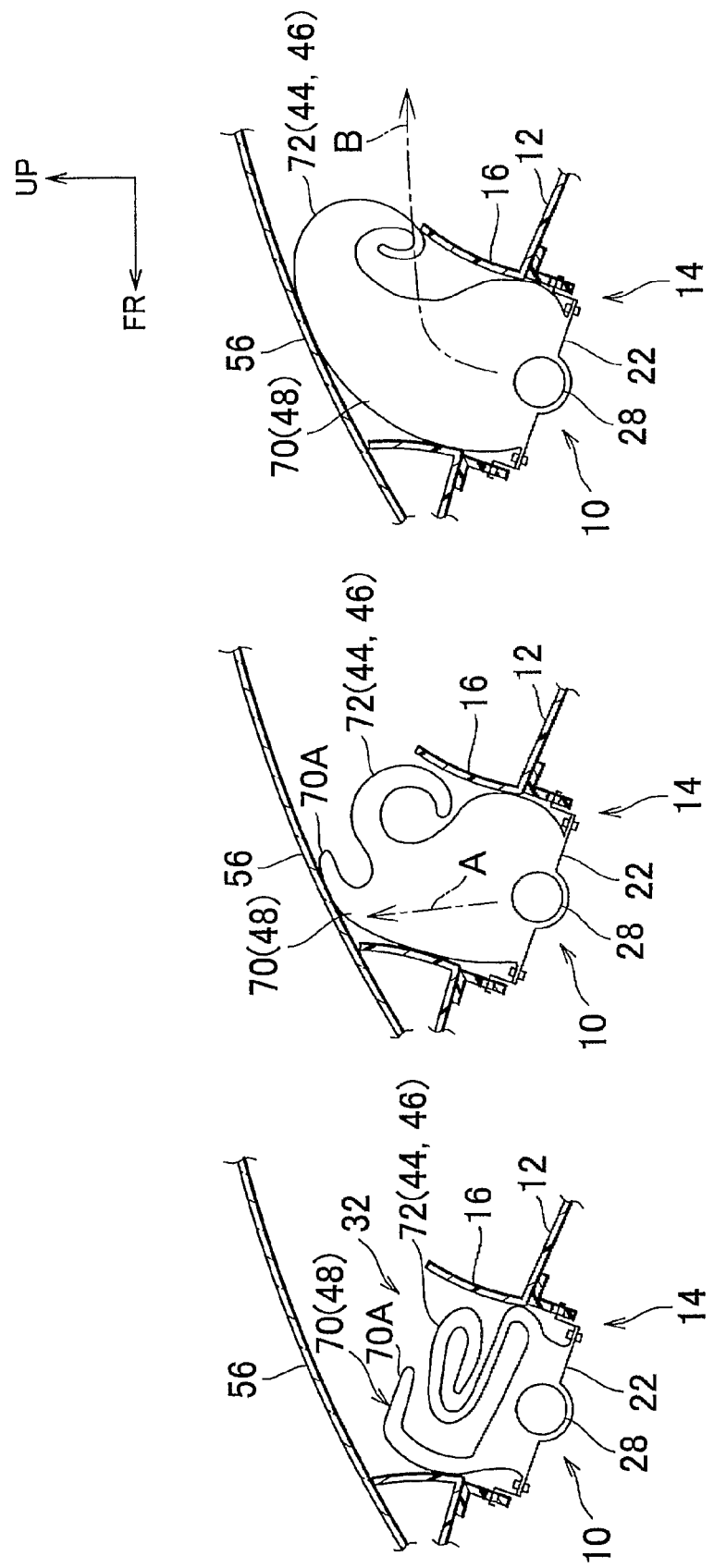

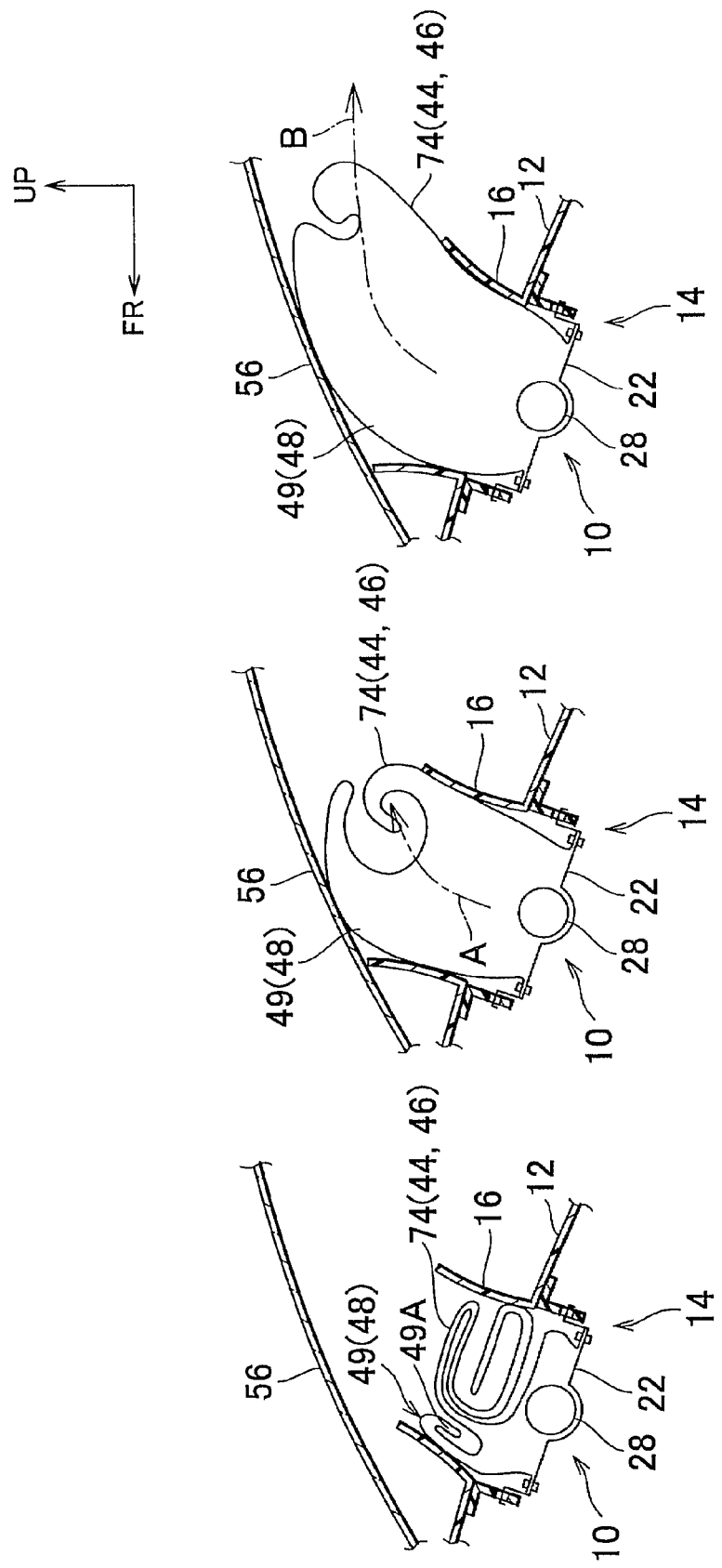

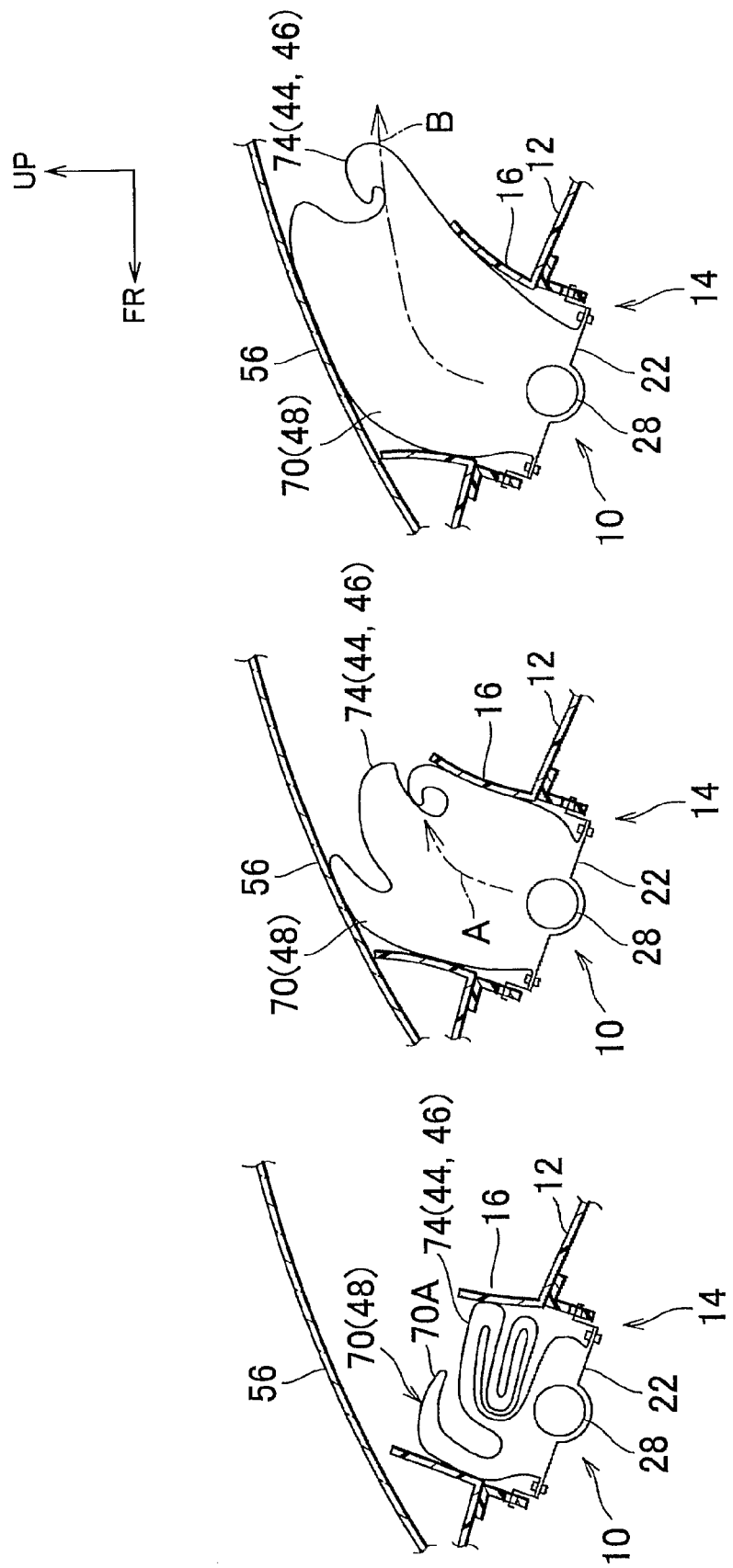

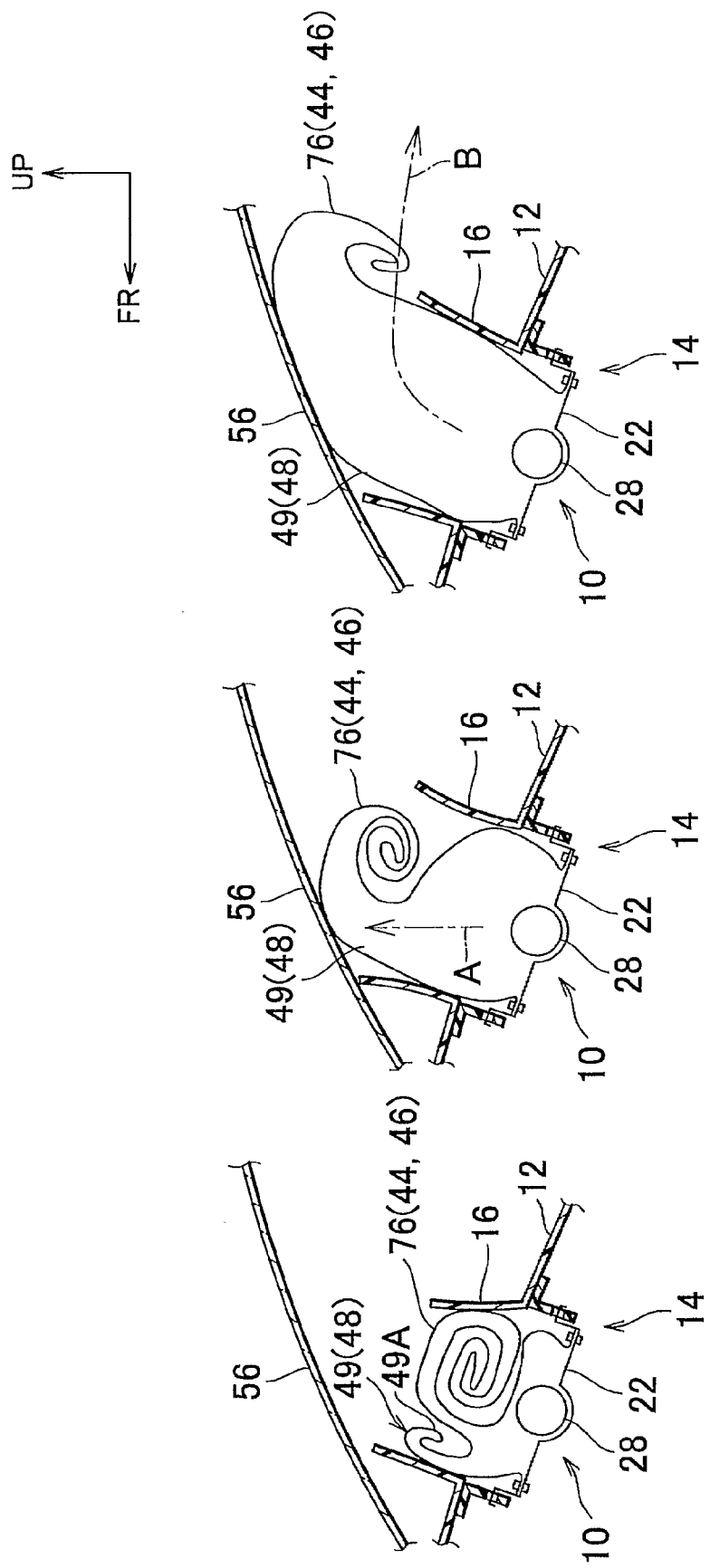

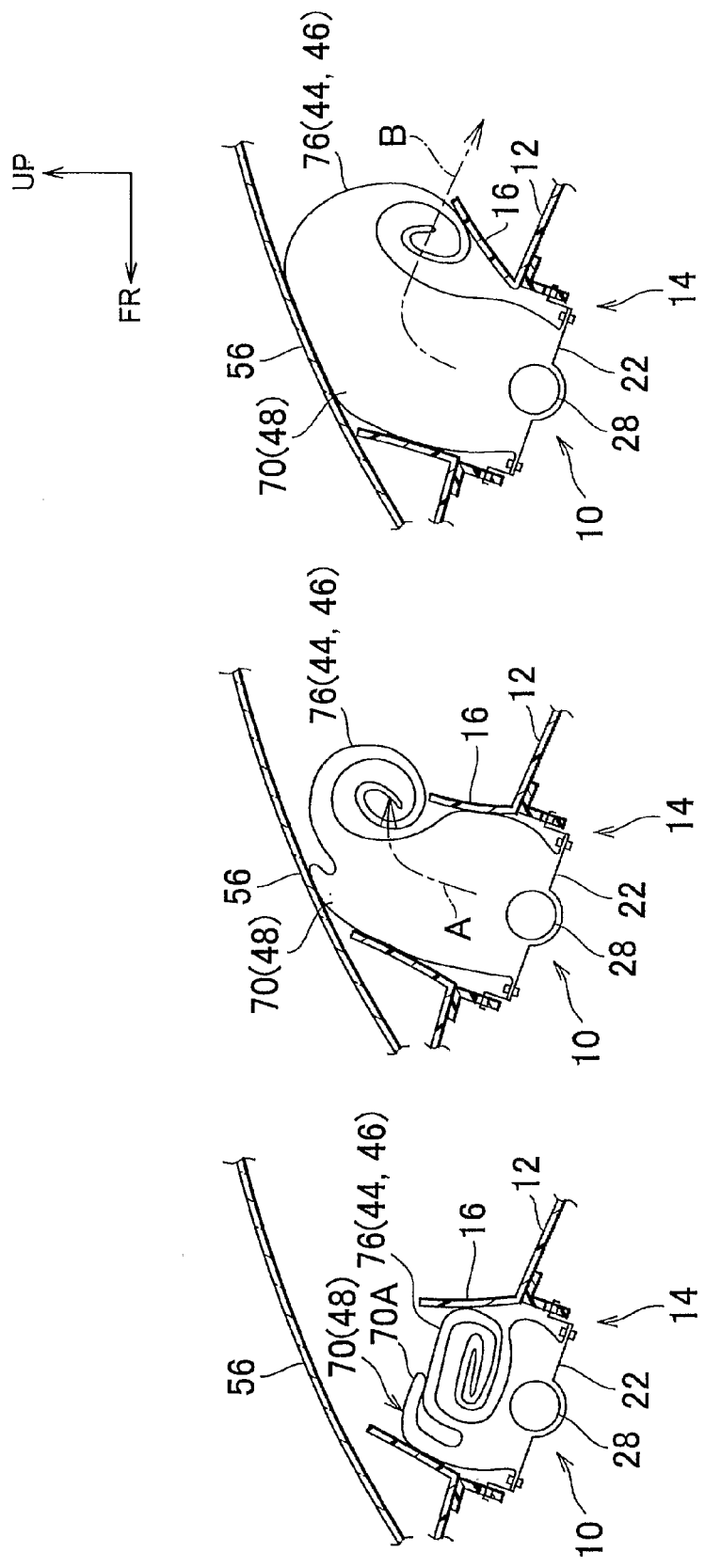

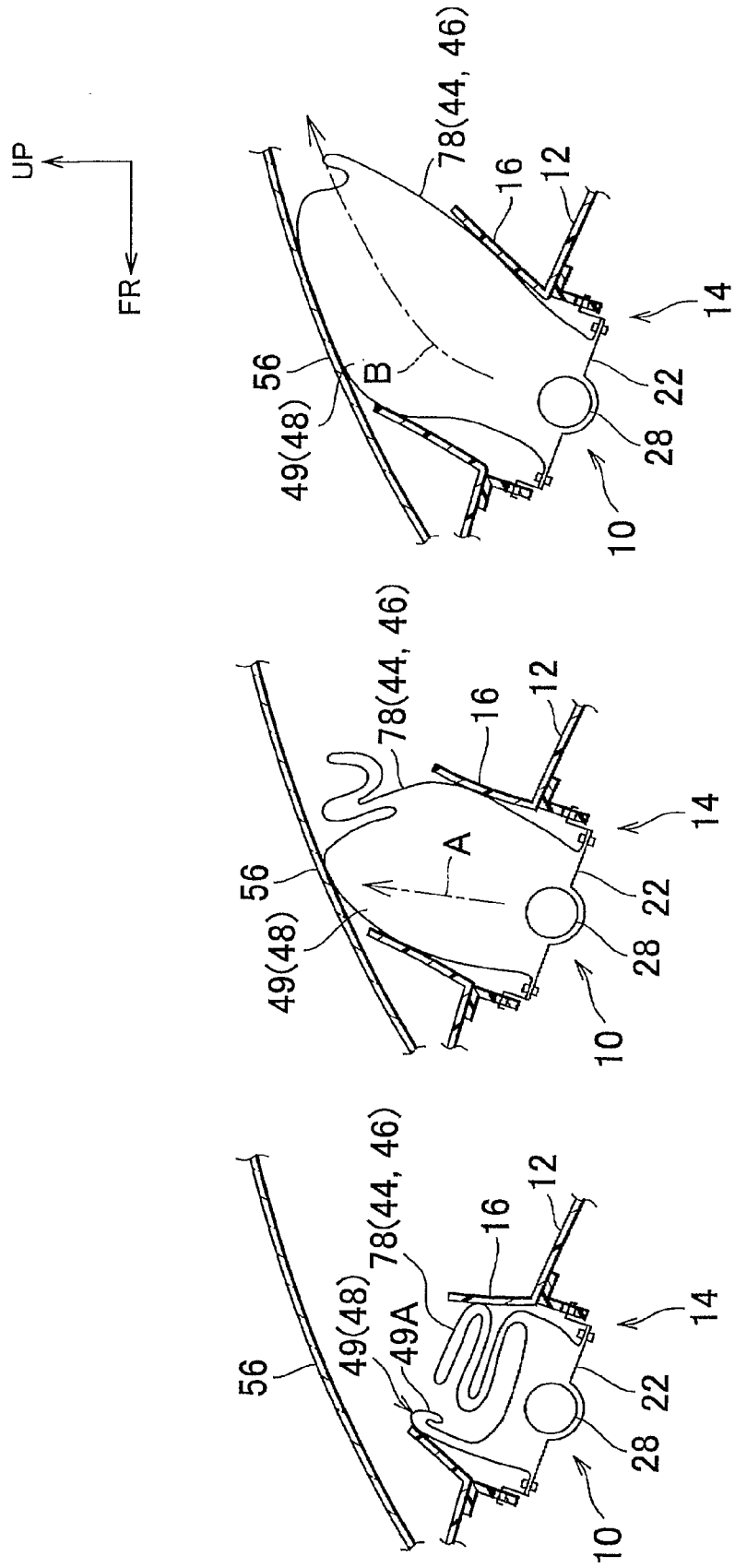

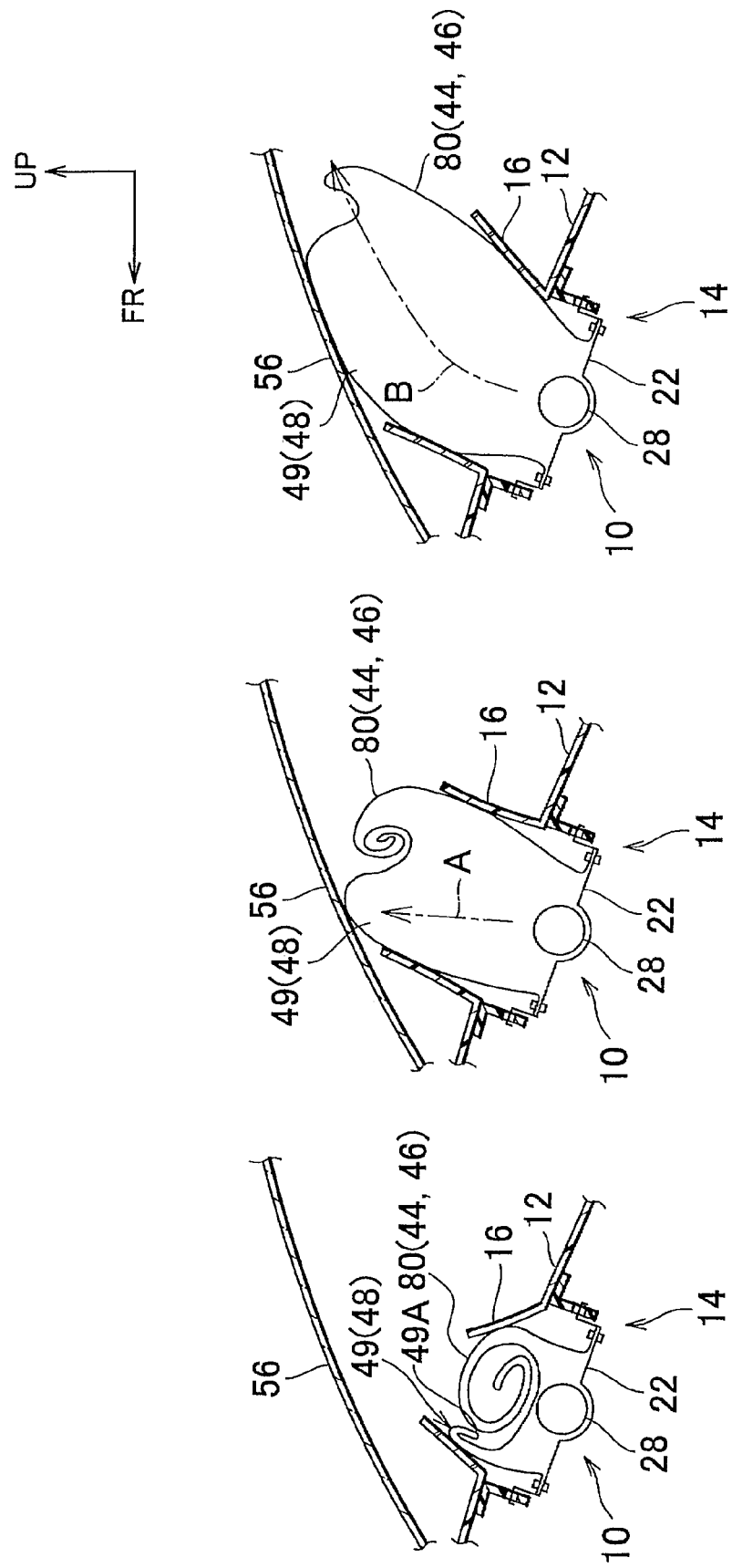

METHOD OF FOLDING PASSENGER-SEAT AIRBAG

BACKGROUND OF THE INVENTION

1. Field of the Invention

The invention relates to a method of folding a passenger-seat airbag that is folded and stored in a passenger-seat airbag device.

2. Description of the Related Art

Conventionally, a passenger-seat airbag device is provided to protect an occupant seated at a passenger seat from an impact at the time of frontal collision. Japanese Patent Application Publication JP-A-2004-268903 describes an example of a passenger-seat airbag device in which a passenger-seat airbag includes a pair of left and right airbags, and a recess is formed between the left and right airbags. When the passenger-seat airbag starts to be deployed, the passenger-seat airbag receives a plurality of areas of the occupant's body, such as the shoulders. As a result, the load applied to the occupant is dispersed and reduced.

With this configuration, the airbag is ordinarily folded and stored, for example, below the top wall portion of an instrument panel. When a frontal collision occurs, the airbag opens an airbag door provided in the top wall portion of the instrument panel. Then, the airbag hits the windshield, and the airbag is deployed toward the rear of the vehicle. As a result, the airbag receives the shoulders and the like of the occupant seated at the passenger seat to absorb the impact. Accordingly, as the accuracy of the direction in which the airbag is deployed is higher, the performance of protecting the occupant is more stable.

It is conventionally known that the direction in which a single airbag is deployed is changed by changing the method of folding the airbag. Therefore, when employing the passenger-seat air bag that includes the above-described pair of left and right airbags, it is extremely difficult to improve the accuracy of the direction in which the airbag is deployed.

SUMMARY OF THE INVENTION

It is an object of the invention to provide a method of folding a passenger-seat airbag, which improves the accuracy of the direction in which the passenger-seat airbag is deployed.

An aspect of the invention relates to a method of folding a passenger-seat airbag that includes a root portion that receives gas injected from an inflator when the inflator operates, and an airbag body that is connected to the root portion, and that is deployed toward a passenger seat when the gas flows into the airbag body via the root portion. The method includes folding the airbag body such that the airbag body has a strip shape, and then folding the airbag body toward one side in a longitudinal direction to form an airbag folded portion, wherein the airbag body is positioned closer to the rear of a vehicle than the root portion is when the passenger-seat airbag is provided in the vehicle; and making the root portion slack to form a slack portion, and making the slack portion upright along the airbag folded portion, wherein the root portion is positioned closer to the front of the vehicle than the airbag folded portion is when the passenger-seat airbag is provided in the vehicle.

According to the first aspect of the invention, the gas is injected from the inflator when the inflator operates, and the gas is supplied to the root portion of the passenger-seat airbag. Because the root portion is connected to the airbag body, the gas supplied to the root portion flows into the airbag body via the root portion, and deploys the airbag body toward the passenger seat. Thus, the airbag body receives the upper part of the occupant's body seated at the passenger seat, and absorbs impact.

According to the above-described aspect, when the passenger-seat airbag is folded, first, the airbag body is folded to have a strip shape, and then, the airbag body is folded toward one side in the longitudinal direction. Thus, the airbag folded portion of the passenger-seat airbag, which is equivalent to the airbag body, is formed. Next, the root portion is made slack to form the slack portion. The slack portion is made upright along the airbag folded portion. The passenger-seat airbag that is folded in the above-described manner is provided in the vehicle such that the airbag folded portion is positioned closer to the rear of the vehicle than the root portion is, and the root portion is positioned closer to the front of the vehicle than the airbag folded portion is.

When operating the passenger-seat airbag device in which the slack portion that forms the root portion and the airbag folded portion are positioned in the fore-and-aft direction in the above-described manner, the gas injected from the inflator flows into the slack portion of the root portion that is made upright along the airbag folded portion earlier than into the airbag folded portion that is formed by folding the airbag body so that the airbag body has a strip shape, and then folding the airbag body to one side in the longitudinal direction. Therefore, the root portion is expanded and deployed earlier, and "a wall" is formed at the position close to the front of the vehicle. After the wall is formed, the airbag folded portion is unfolded, and the airbag body is deployed toward the occupant seated at the passenger seat. Because the root portion connected to the airbag body forms the "wall" at this time, the airbag body is extremely stably expanded and deployed in a given direction.

As described above, the method of folding the passenger-seat airbag according to the first aspect of the invention has the excellent effect of improving the accuracy of the direction in which the passenger-seat airbag is deployed.

A second aspect of the invention relates to a method of folding a passenger-seat airbag that includes an airbag body including a left airbag and a right airbag that correspond to the left and right shoulders of an occupant seated at a passenger seat; and a root portion that receives gas injected from an inflator when the inflator operates, and that connects a left-airbag root portion and a right-airbag root portion. The method includes folding each of the left and right airbags such that each of the left and right airbags has a strip shape, and then folding the left and right airbags that are overlapped with each other, toward one side in a longitudinal direction to form an airbag folded portion, wherein the left and right airbags are positioned closer to the rear of a vehicle than the root portion is when the passenger-seat airbag is provided in the vehicle; and making the root portion slack to form a slack portion, and making the slack portion upright along the airbag folded portion, wherein the root portion is positioned closer to the front of the vehicle than the left and right airbags are when the passenger-seat airbag is provided in the vehicle.

According to the second aspect of the invention, when the inflator operates, the gas is injected, and supplied to the root portion of the passenger-seat airbag. Because the root portion connects left-airbag root portion and the right-airbag root portion, the gas supplied to the root portion flows into the left airbag and the right airbag, and deploys both of the airbags toward the passenger seat. The left airbag receives the left shoulder of the occupant seated at the passenger seat. The right airbag receives the right shoulder of the occupant. Both of the airbags receive the upper part of the occupant's body such that the upper part of the occupant's body is in a stable state. Thus, the left and right airbags absorb the impact at the time of frontal collision, and the load applied to the occupant from the airbags is dispersed and reduced.

According to the above-described aspect, when the passenger-seat airbag is folded, first, each of the left and right airbags is folded to have a strip shape, and then, the left and right airbags that are overlapped with each other are folded toward one side in the longitudinal direction. Thus, the airbag folded portion of the passenger-seat airbag, which is equivalent to the left and right airbags, is formed. Next, the root portion that connects the left-airbag root portion and the right-airbag root portion is made slack to form the slack portion. The slack portion is made upright along the airbag folded portion. The passenger-seat airbag that is folded in the above-described manner is provided in the vehicle such that the airbag folded portion is positioned closer to the rear of the vehicle than the root portion is, and the root portion is positioned closer to the front of the vehicle than the airbag folded portion is.

When operating the passenger-seat airbag device in which the slack portion that forms the root portion and the airbag folded portion are positioned in the fore-and-aft direction in the above-described manner, the gas injected from the inflator flows into the root portion that is made upright along the airbag folded portion earlier than into the airbag folded portion that is formed by folding each of the left and right airbags so that each of the left and right airbags has a strip shape, and then folding the left and right airbags that are overlapped with each other, to one side in the longitudinal direction. Therefore, the root portion is expanded and deployed earlier, and "a wall" is formed at the position close to the front of the vehicle. After the wall is formed, the airbag folded portion is unfolded, and the left and right airbags are deployed toward the occupant seated at the passenger seat. Because the root portion that connects the left-airbag root portion and the right-airbag root portion forms the "wall" at this time, the left and right airbags are extremely stably expanded and deployed in a given direction.

The method of folding the passenger-seat airbag according to the second aspect of the invention has the excellent effect of improving the accuracy of the direction in which the passenger-seat airbag is deployed.

In the second aspect of the invention, the surfaces of each of the left and right airbags, which are the left and right surfaces of each of the left and right airbags when each of the left and right airbags is deployed in the vehicle, may be overlapped with each other so that each of the left and right airbags is flat; a lower portion of each of the left and right airbags, which is a lower one-third portion in a vehicle-height direction when each of the left and right airbags is deployed in the vehicle, may be accordion-folded toward a center of each of the left and right airbags; an upper portion of each of the left and right airbags, which is an upper one-third portion in the vehicle-height direction when each of the left and right airbags is deployed in the vehicle, may be rolled up toward the center; and the rolled-up upper portion may be placed on the accordion-folded lower portion so that each of the left and right airbags has the strip shape.

In the above-described aspect, the airbag folded portion may be formed mainly by rolling up the airbag body.

Generally, the time required for the gas to reach the end of the rolled-up portion is longer than the time required for the gas to reach the end of the accordion-folded portion. That is, the rolled-up portion is unfolded less easily than the accordion-folded portion.

According to the invention, when the passenger-seat airbag is provided in the vehicle, the slack portion of the root portion is positioned closer to the front of the vehicle than the airbag folded portion is, and the airbag folded portion is positioned closer to the rear of the vehicle than the slack portion is. Therefore, the gas injected from the inflator is about to flow into the slack portion of the root portion and the airbag folded portion. However, because the airbag folded portion is formed mainly by rolling up the airbag body so that the airbag folded portion is not unfolded easily, the gas injected from the inflator intensively flows into the slack portion of the root portion, and expands and deploys the slack portion instantly.

The method of folding the passengers-seat airbag has the excellent effect of improving the accuracy of the direction in which the passenger-seat airbag is deployed.

In the above-described aspect, the airbag folded portion may be formed by rolling up an end portion of the airbag body, which is distant from the root portion, twice to form a rolled-up portion, and then accordion-folding another end portion of the airbag body, which is close to the root portion, once to form an accordion-folded portion, and placing the rolled-up portion on the accordion-folded portion.

In the above-described aspect, the airbag folded portion may be formed by rolling up an end portion of the airbag body, which is distant from the root portion, once to form a rolled-up portion, and then accordion-folding another end portion of the airbag body, which is close to the root portion, once to form an accordion-folded portion, and placing the accordion-folded portion on the rolled-up portion.

In the above-described aspect, the airbag folded portion may be formed by rolling up the airbag body three times, or by accordion-folding the airbag body twice.

In the above-described aspect, the tip portion of the slack portion that forms the root portion may be accordion-folded toward the airbag folded portion.

According to the above-described aspect, because the tip portion of the slack portion that forms the root portion is accordion-folded toward the airbag folded portion, the root portion can be quickly expanded and deployed. Because the root portion is made slack to form the slack portion when the passenger-seat airbag is folded, the slack portion may be somewhat long in a lateral view. In this case, when the slack portion is made upright along the airbag folded portion, the tip portion of the slack portion may protrude beyond the airbag folded portion.

If the tip portion of the slack portion were accordion-folded toward the front of the vehicle, the slack portion would be inflated more slowly. As a result, it would take much time to fill the space between the top wall portion of the instrument panel and the windshield. Meanwhile, according to the invention, by accordion-folding the tip portion of the slack portion toward the airbag folded portion, the slack portion can be inflated quickly, and the space can be filled quickly.

The method of folding the passenger-seat airbag in the above-described aspect has the excellent effect that the slack portion can be quickly expanded and deployed as intended, even if the slack portion is somewhat long.

In the above-described aspect of the invention, the tip portion of the slack portion that forms the root portion may be bent toward the airbag folded portion at a substantially right angle.

According to the above-described aspect, the gas quickly flows into the tip portion of the slack portion, and quickly expands the slack portion, as compared to the case where the tip portion is accordion-folded toward the rear of the vehicle.

In the above-described aspect, the tip portion of the slack portion may be positioned above the airbag folded portion.

In the above-described aspect of the invention, the tip portion of the slack portion that forms the root portion may be oriented toward the top of the vehicle such that the tip portion is in a substantially upright state.

According to the above-described aspect, the gas quickly flows into the tip portion of the slack portion, and quickly expands the slack portion, as compared to the case where the tip portion is bent toward the rear of the vehicle at a substantially right angle.

A passenger-seat airbag device according to an aspect of the invention includes the passenger-seat airbag that is folded using the method in any one of the above-described aspects; the inflator that injects the gas; and an airbag case in which the passenger-seat airbag and the inflator are housed.

In the passenger-seat airbag device according to the above-described aspect, the airbag body includes a left airbag and a right airbag, and when the passenger-seat airbag is inflated, the substantially center of the inner portion of the left airbag may contact the substantially center of the inner portion of the right airbag. Also, the passenger-seat airbag device may further include a connection member that connects the rear end of the left airbag with the rear end of the right airbag.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein:

FIG. 4A is a plan view, FIG. 4B is a front view, and FIG. 4C is a lateral view;

FIGS. 5A to 5C are diagrams showing the processes of the method of folding the passenger-seat airbag according to the embodiment of the invention, FIG. 5A is a plan view, FIG. 5B is a partial front view, and FIG. 5C is an enlarged cross sectional view taken along line C-C of FIG. 5A;

FIG. 6A is a plan view, FIG. 6B is a partial front view, and FIG. 6C is a lateral view;

FIG. 7A is a plan view, and FIG. 7B is a front view;

FIG. 8A is a plan view, and FIG. 8B is a front view;

FIG. 9A is a plan view, and FIG. 9B is a front view;

FIG. 10A is a plan view, and FIG. 10B is a front view;

FIG. 11A is a plan view, and FIGS. 11B and 11C are enlarged front views each showing the main portion of the passenger-seat airbag;

FIGS. 13A to 13C are explanatory diagrams explaining the effects of the method of folding the passenger-seat airbag according to the embodiment of the invention, FIG. 13A is a longitudinal cross sectional view showing the state of the passenger-seat airbag that starts to be deployed, FIG. 13B is a longitudinal cross sectional view showing the state of the passenger-seat airbag in which the slack portion is expanded, and FIG. 13C is a longitudinal cross sectional view showing the state of the passenger-seat airbag that is being deployed;

FIG. 14A is a schematic longitudinal cross sectional view showing the definition of the direction in which the passenger-seat airbag is deployed, and FIG. 14B is a schematic longitudinal cross sectional view showing various trajectories of the movement of the passenger-seat airbag and various directions in which the passenger-seat airbag is deployed;

FIGS. 15A to 15C are explanatory diagrams showing the method of folding the passenger-seat airbag according to a first modified example of the embodiment of the invention, which correspond to FIGS. 13A to 13C;

FIGS. 16A to 16C are explanatory diagrams showing the method of folding the passenger-seat airbag according to a second modified example of the embodiment of the invention, which correspond to FIGS. 13A to 13C;

FIGS. 17A to 17C are explanatory diagrams showing the method of folding the passenger-seat airbag according to a third modified example of the embodiment of the invention, which correspond to FIGS. 13A to 13C;

FIGS. 18A to 18C are explanatory diagrams showing the method of folding the passenger-seat airbag according to a fourth modified example of the embodiment of the invention, which correspond to FIGS. 13A to 13C;

FIGS. 19A to 19C are explanatory diagrams showing the method of folding the passenger-seat airbag according to a fifth modified example of the embodiment of the invention, which correspond to FIGS. 13A to 13C;

FIGS. 20A to 20C are explanatory diagrams showing the method of folding the passenger-seat airbag according to a sixth modified example of the embodiment of the invention, which correspond to FIGS. 13A to 13C;

FIGS. 21A to 21C are explanatory diagrams showing the method of folding the passenger-seat airbag according to a seventh modified example of the embodiment of the invention, which correspond to FIGS. 13A to 13C.

DETAILED DESCRIPTION OF THE EXAMPLE EMBODIMENTS

Hereinafter, a method of folding a passenger-seat airbag according to each of embodiments of the invention will be described with reference to FIG. 1 to FIG. 21. In FIG. 1 to FIG. 21, an arrow FR indicates the front of a vehicle, an arrow UP indicates the top of the vehicle, and an arrow IN indicates the inside of the vehicle in a vehicle-width direction.

I. Entire Configuration of the Passenger-Seat Airbag Device 10

Figure 1:
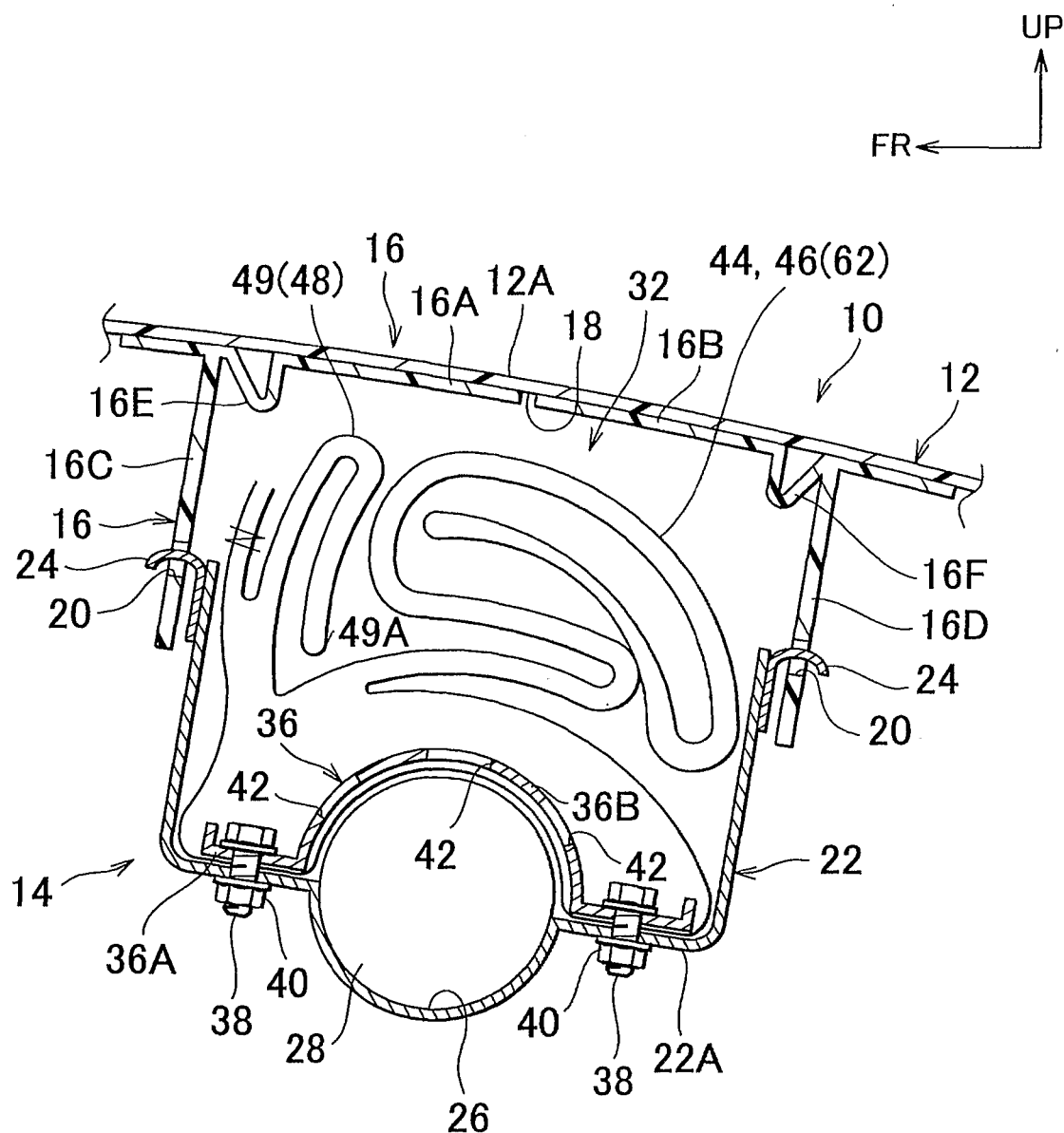
FIG. 1 is a longitudinal cross sectional view showing a passenger-seat airbag device that includes an airbag folded by the method of folding a passenger-seat airbag according to an embodiment of the invention.
Figure 2:
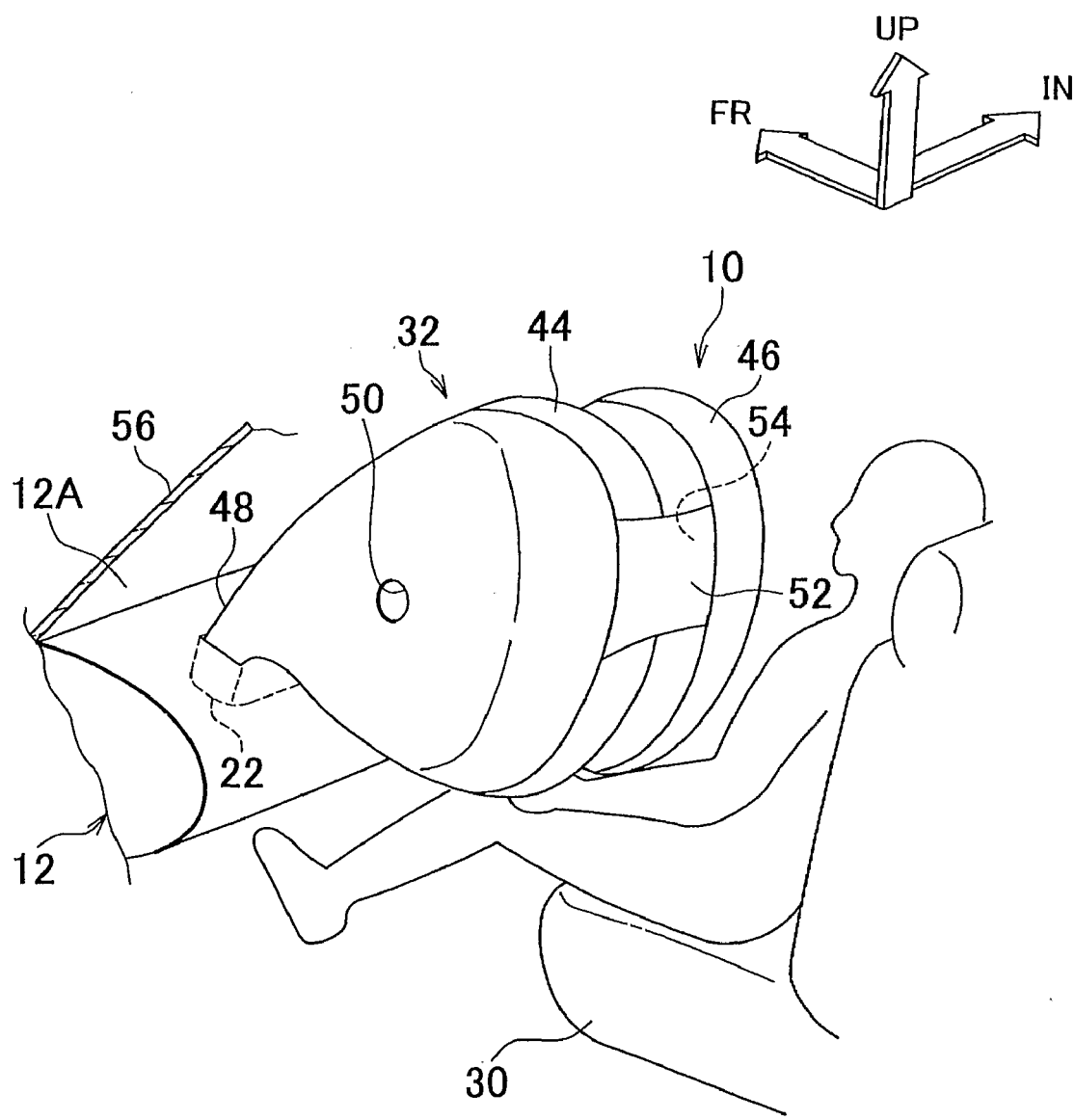
FIG. 2 is a perspective view showing the operating state of the passenger-seat airbag device shown in FIG. 1.

FIG. 1 is a longitudinal sectional view showing a passenger-seat airbag device 10 according to an embodiment of the invention, which is provided in the vehicle. FIG. 2 is a perspective view showing the passenger-seat airbag device 10 that is operated.

As shown in FIGS. 1 and 2, the passenger-seat airbag device 10 is provided under a top wall portion 12A of an instrument panel 12 at a position near the passenger seat. The passenger-seat airbag device 10 includes an airbag module 14 and an airbag door 16. Functional components are stored in the airbag module 14. The airbag door 16 closes an opening at the upper end of the airbag module 14.

The airbag door 16 is provided on the rear side of the top wall portion 12A of the instrument panel 12. The airbag door 16 includes a pair of pivot portions 16A and 16B; and a pair of leg portions 16C and 16D. The pivot portions 16A and 16B pivot toward the front and rear of the vehicle, respectively. The leg portion 16C extends from the rear side of the pivot portion 16A substantially toward the bottom of the vehicle. The leg portion 16D extends from the rear side of the pivot portion 16B substantially toward the bottom of the vehicle. An opening 20 is formed in each of the leg portions 16C and 16D. The pivot portions 16A and 16B are connected to the leg portions 16C and 16D via hinges 16E and 16F, respectively. A tear line 18, which has a substantially H-shape in a plan view, is provided in the airbag door 16. The tear line 18 is invisible. When the expansion pressure of the airbag, which is greater than or equal to a predetermined value, is applied to the tear line 18, the tear line 18 is torn so that the pivot portions 16A and 16B pivot toward the front and rear of the vehicle, respectively.

The airbag module 14 includes an airbag case 22 that has a substantially box shape. The airbag case 22 is supported by a reinforcement member (not shown) such as an instrument panel reinforcement, via a bracket. An engagement portion 24, which has a hook shape, is provided in each of the front wall and rear wall of the airbag case 22. The openings 20 of the leg portions 16C and 16D are engaged with the engagement portions 24 so that the airbag door 16 is fitted to the airbag case 22.

A recess 26, which is a portion protruding toward the bottom of the vehicle, is formed in the bottom wall 22A of the airbag case 22 at the center in a fore-and-aft direction. The recess 26 has a semi-circular cross section. An inflator 28, which has a substantially cylindrical shape, is housed in the recess 26. A passenger-seat airbag 32, which is folded, is housed above the inflator 28. When the inflator 28 injects gas, the passenger-seat airbag 32 is inflated, which opens the airbag door 16. Thus, the passenger-seat airbag 32 is expanded toward an occupant seated at the passenger seat 30.

An opening is formed in a root portion 48 (described later) of the passenger-seat airbag 32. Gas is supplied to the passenger-seat airbag 32 through the opening. A metallic retainer 36 is fitted to the inside of the opening. The retainer 36 includes an outer periphery 36A and a body 36B inside the outer periphery 36A. The outer periphery 36A has a substantially rectangular-frame shape. The body 36B has a hollow semi-cylindrical shape. The upper half of the inflator 28 is fitted in the body 36B. Bolts 38, which protrude from the outer periphery 36A of the retainer 36 toward the bottom of the vehicle, are screwed into nuts 40. As a result, the retainer 36 is fixed to the bottom wall 22A of the airbag case 22, and the inflator 28 is fixed to the recess 26 of the bottom wall 22A. A plurality of openings 42 are formed in the body 36B of the retainer 36. Thus, the retainer 36 functions as a diffuser that adjusts the flow of gas.

A plurality of gas-injection holes (not shown) are formed in a predetermined arrangement in the peripheral wall of the inflator 28 at predetermined positions. When a front airbag sensor and a center airbag sensor (neither of them are shown) detect a frontal collision, an airbag ECU (not shown) operates the inflator 28 so that gas is injected through the gas-injection holes. The front airbag sensor is provided in the front portion of the vehicle at a predetermined position. The center airbag sensor is provided in the center portion of the vehicle.

Next, the structure of the passenger-seat airbag 32 that is expanded by the gas injected from the inflator 28 will be described.

Figure 3:
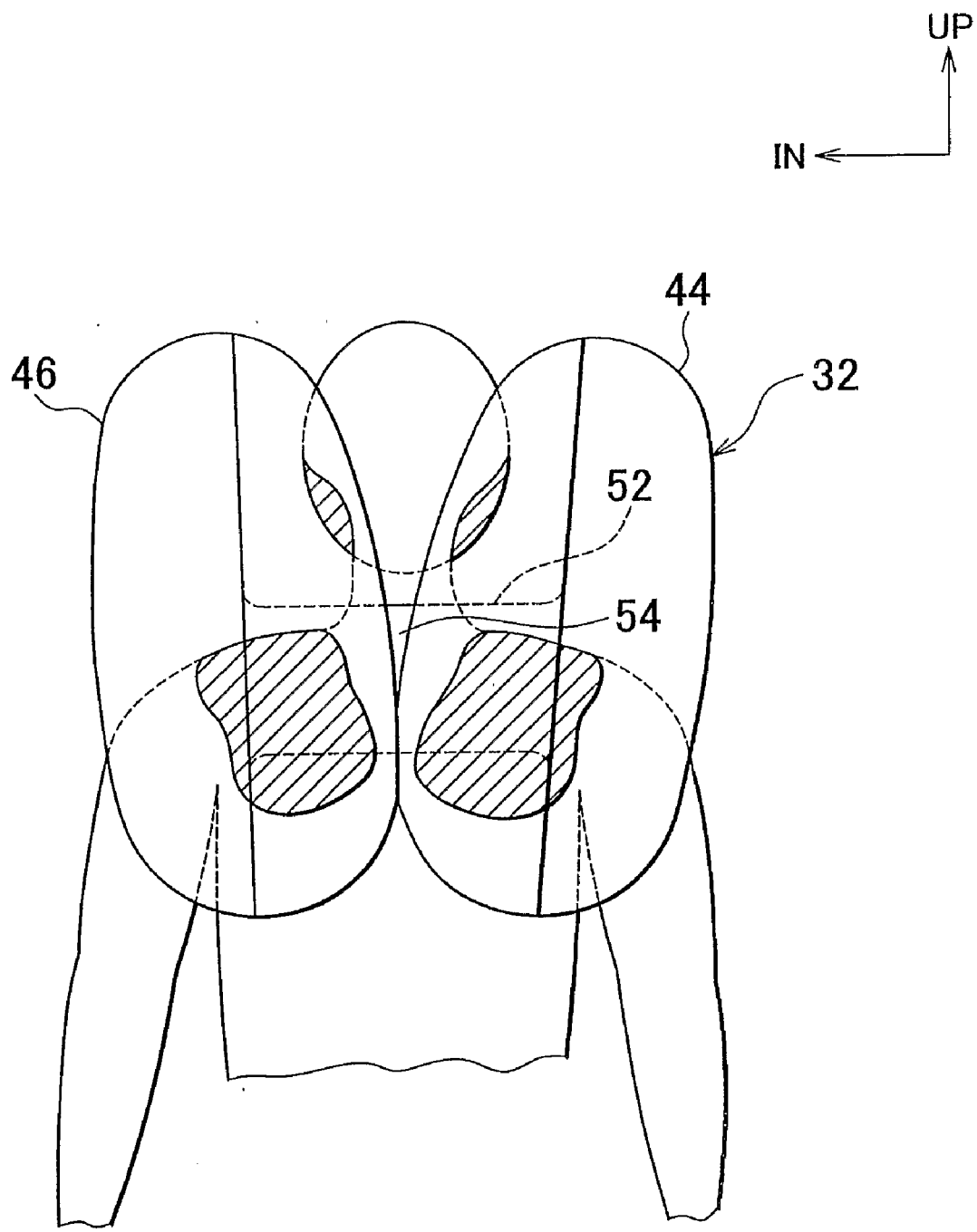
FIG. 3 is a schematic diagram showing the areas of the occupant's body where loads are applied when the passenger-seat airbag is deployed.

As shown in FIGS. 2 and 3, the passenger-seat airbag 32 includes a left airbag 44, a right airbag 46, and a root portion 48. The left airbag 44 is inflated ahead of, and on the left side of the occupant seated at the passenger seat so that the left airbag 44 receives mainly the left shoulder of the occupant. The right airbag 46 is inflated ahead of, and on the right side of the occupant so that the right airbag 46 receives mainly the right shoulder of the occupant. The root portion 48 connects the root portion of the left airbag 44 (i.e., left-airbag root portion) and the root portion of the right airbag 46 (i.e., right-airbag root portion).

In a plan view, each of the left airbag 44 and the right airbag 46 is formed such that the length in the vehicle-width direction is smaller than the length in the vehicle-height direction. In a lateral view, each of the left airbag 44 and the right airbag 46 is formed such that the length in the vehicle-height direction increases from a front end toward a rear end. A vent hole 50 is formed near the center of the outer portion of each of the left airbag 44 and the right airbag 46 (refer to FIG. 2). When the left airbag 44 and the right airbag 46 receive the occupant, the gas is discharged through the vent holes 50 so that the pressure inside the airbags is reduced.

When the passenger-seat airbag 32 is inflated, the substantially center of the inner portion of the left airbag 44 contacts the substantially center of the inner portion of the right airbag 46. This prevents the left airbag 44 and the right airbag 46 from being bent at the center positions thereof when the occupant moves toward the front of the vehicle due to inertia and a load is applied to the rear ends of the left airbag 44 and the right airbag 46 by the occupant at the time of frontal collision.

A tie panel 52 made of cloth connects the rear end of the left airbag 44 with the rear end of the right airbag 46 in the vehicle-width direction. The tie panel 52 has a rectangular shape when viewed from the occupant side. The tie panel 52 is provided at such a position and in such a range that the tie panel 52 can receive the chest of the occupant when the occupant moves toward the front of the vehicle due to inertia at the time of frontal collision. Thus, the tie panel 52 softly receives the chest of the occupant at the time of frontal collision. As described above, when the left airbag 44 and the right airbag 46 are inflated, the inner portion of the left airbag 44 contacts the inner portion of the right airbag 46, which reduces a space 54 on the rear side of the tie panel 52. This prevents the chest of the occupant from being excessively inserted between the left airbag 44 and the right airbag 46. In a broad sense, the tie panel 52 is a member that connects the rear end of the left airbag 44 with the rear end of the right airbag 46 in the vehicle-width direction.

The shaded areas in FIG. 3 schematically show the areas of the occupant's body where loads are applied from the left airbag 44 and the right airbag 46 at the time of frontal collision. Thus, as shown in FIG. 3, the load applied to the occupant is dispersed.

As described above, the root portion 48 connects the root portion of the left airbag 44 (left-airbag root portion) with the root portion of the right airbag 46 (right-airbag root portion). That is, the left airbag 44 and the right airbag 46 have the root portion 48 in common. When the inflator 28 injects gas into the root portion 48, the passenger-seat airbag 32, which is folded in the manner described below, is inflated.

II. Method of Folding the Passenger-Seat Airbag 32

Next, the method of folding the passenger-seat airbag 32 according to the embodiment will be described.

Because the tie panel 52 connects the left airbag 44 with the right airbag 46, the left airbag 44 and the right airbag 46 are folded individually. More specifically, first, the left airbag 44 is laid. The lower portion of the left airbag 44, which is the lower one-third portion of the left airbag 44 in the vehicle-height direction when the left airbag 44 is deployed in the vehicle, is accordion-folded toward the center of the left airbag 44. The upper portion of the left airbag 44, which is the upper one-third portion of the left airbag 44 in the vehicle-height direction when the left airbag 44 is deployed in the vehicle, is rolled up toward the center of the left airbag 44. Accordingly, the length of the left airbag 44 in the vehicle-height direction is reduced, and the accordion-folded lower portion and the rolled-up upper portion come closer to the center. As a result, the accordion-folded lower portion is placed adjacent to the rolled-up upper portion. Then, the rolled-up upper portion is placed on the accordion-folded lower portion. Thus, the process of folding the left airbag 44 is terminated. As a result, the left airbag 44 is folded to have a strip shape.

Next, the right airbag 46 is folded in the same manner. As a result, the right airbag 46 is also folded to have a strip shape. The left airbag 44 or the right airbag 46 may be folded first.

Figure 4A:
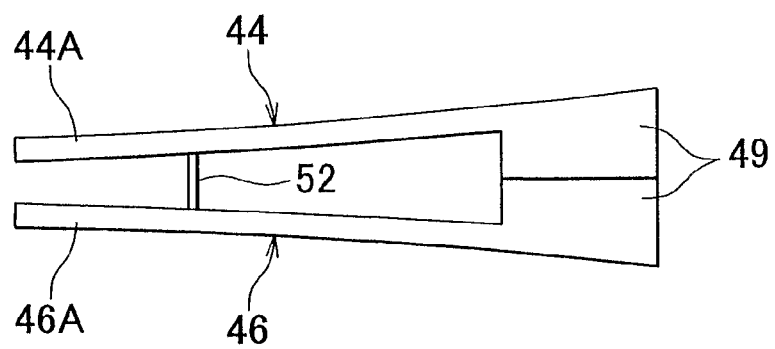
FIGS. 4A to 4C are diagrams showing the processes of the method of folding the passenger-seat airbag according to the embodiment of the invention.
Figure 4B:
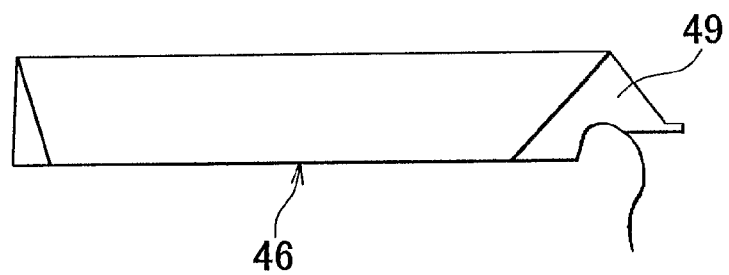
Figure 4C:
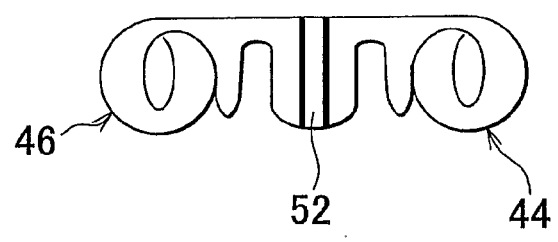

FIGS. 4A (plan view), 4B (front view), and 4C (lateral view) show the left airbag 44 and the right airbag 46 that are folded in the aforementioned process. In FIGS. 4A to 4C, the slack portion of the root portion 48 is denoted by a reference numeral 49.

As shown in FIG. 5A (plan view), the passenger-seat airbag 32 is turned around to the opposite direction so that the slack portion 49 is positioned on the left side. Also, the left airbag 44 is overlapped with the right airbag 46. The tip portion 44A of the left airbag 44 (i.e., the tip portion ahead of the tie panel 52) and the tip portion 46A of the right airbag 46 (i.e., the tip portion ahead of the tie panel 52) are bent by 45 degrees so that the tip portion 44A and the tip portion 46A are apart from each other. As a result, the entire passenger-seat airbag 32 has a T-shape. As shown in FIG. 5C (cross sectional view taken along line C-C in FIG. 5A), both sides 49A of the slack portion 49 are accordion-folded.

Figure 6A:
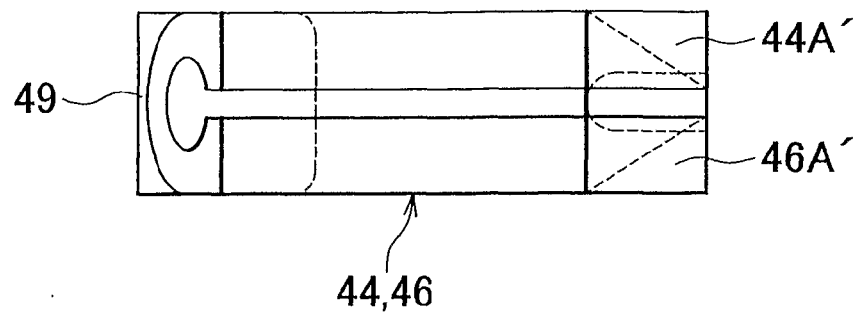
FIGS. 6A to 6C are diagrams showing the processes of the method of folding the passenger-seat airbag according to the embodiment of the invention.
Figure 6B:
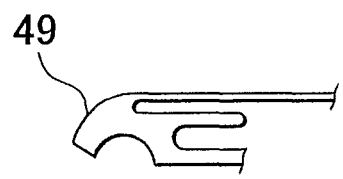
Figure 6C:
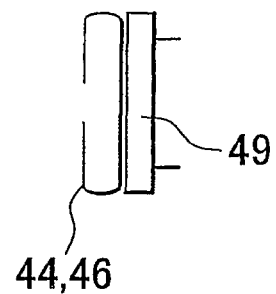

Then, the protruding portion 44A' of the tip portion 44A and the protruding portion 46A' of the tip portion 46A are folded toward the center so that the entire passenger-seat airbag 32 has the shape shown in FIGS. 6A (plan view), 6B (partial front view), and 6C (lateral view).

Figure 7A:
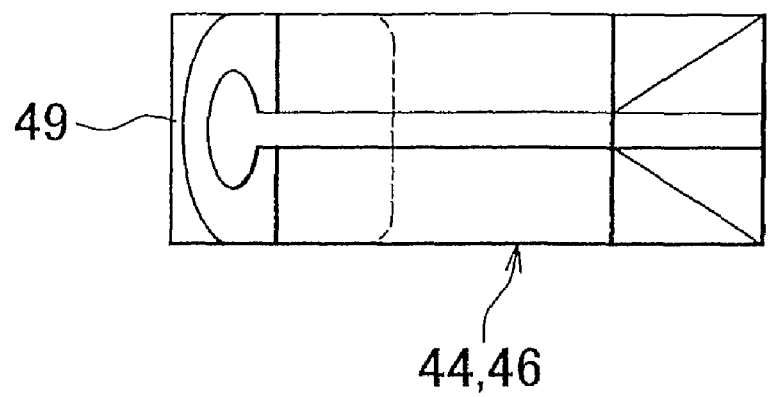
FIGS. 7A and 7B are diagrams showing the processes of the method of folding the passenger-seat airbag according to the embodiment of the invention.
Figure 7B:
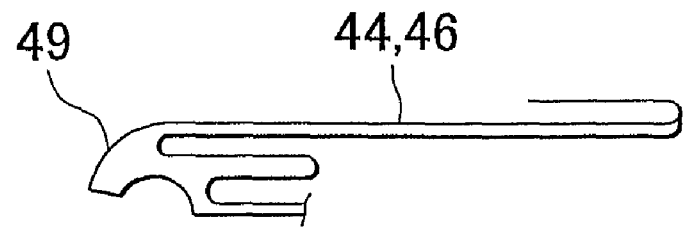
Figure 8A:
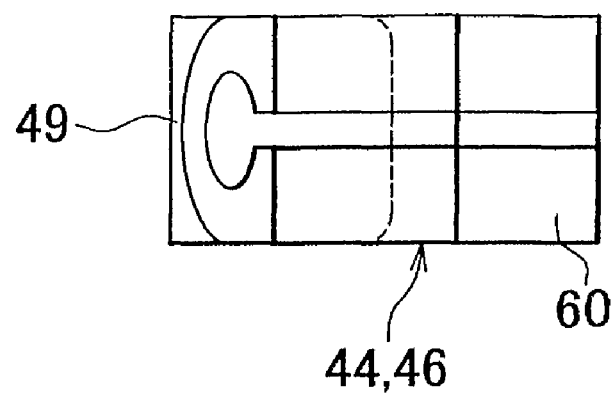
FIGS. 8A and 8B are diagrams showing the processes of the method of folding the passenger-seat airbag according to the embodiment of the invention.
Figure 8B:
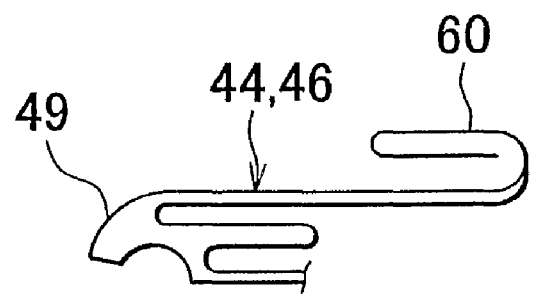
Figure 9A:
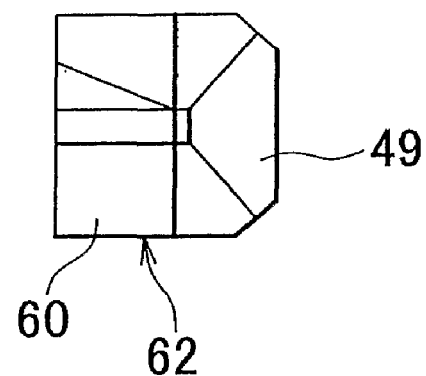
FIGS. 9A and 9B are diagrams showing the processes of the method of folding the passenger-seat airbag according to the embodiment of the invention.
Figure 9B:
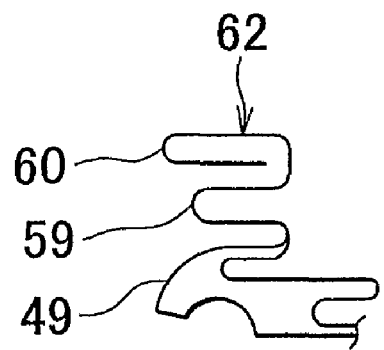

Subsequently, as shown in FIGS. 7A (plan view) and 7B (front view), while the left airbag 44 is overlapped with the right airbag 46, the end portion of the left and right airbags 44 and 46 in a longitudinal direction (i.e., the end near the tie-panel 52) is rolled up toward the slack portion 49. FIGS. 7A and 7B show the passenger-seat airbag 32 in which the end portion of the left and right airbags 44 and 46, which is distant from the slack portion 49, is rolled up once. FIGS. 8A (plan view) and 8B (front view) show the passenger-seat airbag 32 in which the end portion of the left and right airbags 44 and 46, which is distant from the slack portion 49, is rolled up twice. Finally, the end portion of the left and right airbags 44 and 46, which is close to the slack portion 49, is accordion-folded once, and a rolled-up portion 60 is placed on an accordion-folded portion 59 to form an airbag folded portion 62, as shown in FIGS. 9A (plan view) and 9B (front view).

Figure 10A:
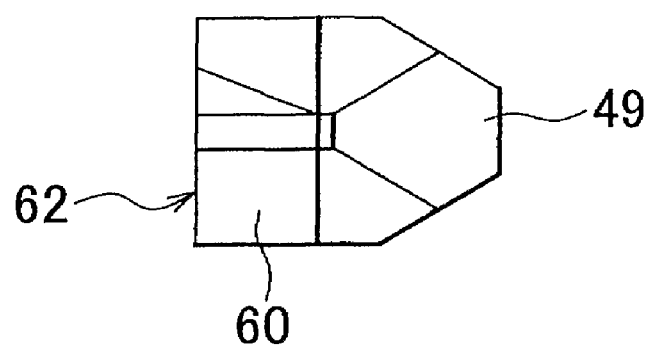
FIGS. 10A and 10B are diagrams showing the processes of the method of folding the passenger-seat airbag according to the embodiment of the invention.
Figure 10B:
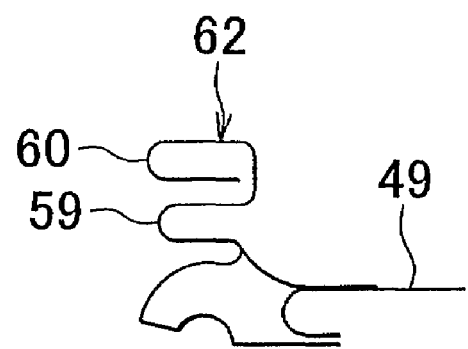
Figure 11C:
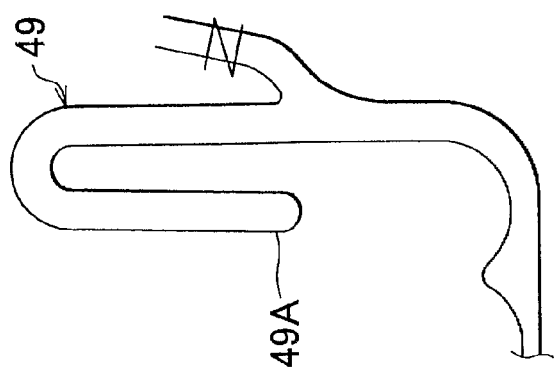
FIGS. 11A to 11C are diagrams showing the processes of the method of folding the passenger-seat airbag according to the embodiment of the invention.
Figure 11A:
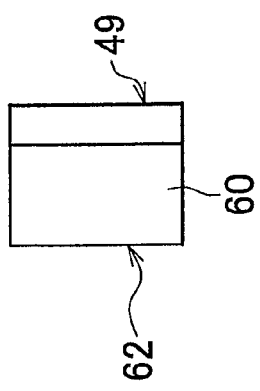
Figure 11B:
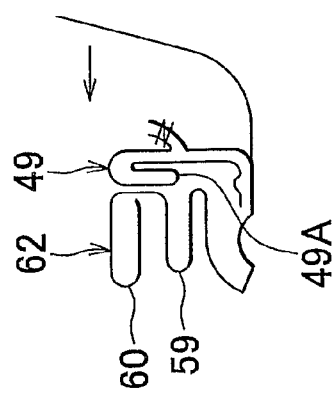

Subsequently, the slack portion 49 is extended as shown in FIGS. 10A (plan view) and 10B (front view). Then, the slack portion 49 is made upright along the airbag folded portion 62, as shown in FIGS. 11A (plan view), 11B (front view), and 11C (expanded view of the main portion). The entire length of the slack portion 49 is slightly larger than the height of the airbag folded portion 62. Therefore, a tip portion 49A that protrudes beyond the airbag folded portion 62 is accordion-folded once toward the airbag folded portion 62 (i.e., toward the rear of the vehicle). The tip portion 49A may be accordion-folded while the slack portion 49 is made upright. Alternatively, the tip portion 49A may be accordion-folded before or after the slack portion 49 is made upright.

Figure 12:
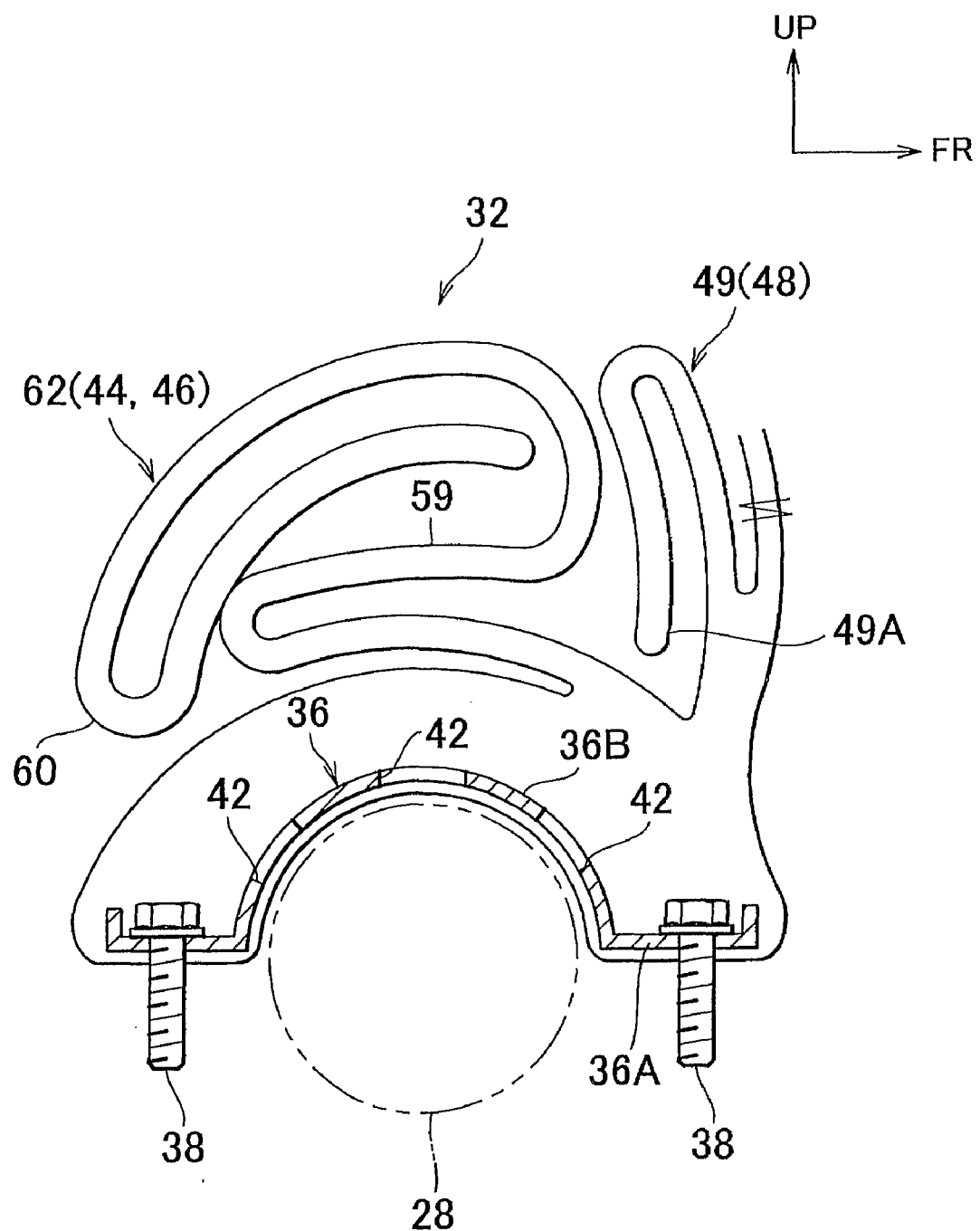
FIG. 12 is a diagram showing the method of folding the passenger-seat airbag according to the embodiment of the invention, and is a front view (partially cross sectional view) showing the state of the passenger-seat airbag when the processes are finished.

The passenger-seat airbag 32, which is folded in the above-described manner, is housed in the airbag case 22 such that the slack portion 49 is positioned closer to the front of the vehicle than the airbag folded portion 62 is, and the airbag folded portion 62 is positioned closer to the rear of the vehicle than the slack portion 49 is when the airbag case 22 is provided in the vehicle, as shown in FIG. 12. The slack portion 49 forms the root portion 48. The airbag folded portion 62 forms the left airbag 44 and the right airbag 46. Then, the airbag case 22 is fitted to the instrument panel 12.

III. Effects

Next, the effects obtained in this embodiment will be described.

First, the overall effect of the passenger-seat airbag device 10 in this embodiment will be summarized. When the front airbag sensor and the center airbag sensor (neither of them are shown) detect a frontal collision, the airbag ECU (not shown) operates the inflator 28 so that gas is injected through the plurality of gas-injection holes formed in the peripheral wall of the inflator 28. After the retainer 36, which functions as the diffuser, adjusts the flow of the injected gas, the gas flows into the passenger-seat airbag 32.

Accordingly, the passenger-seat airbag 32 is inflated. When the pressure inside the passenger-seat airbag 32 reaches a predetermined value, the airbag door 16 is torn along the tear line 18. Thus, the passenger-seat airbag 32 is deployed toward the windshield 56. As a result, the left airbag 44 receives mainly the left shoulder of the occupant seated at the passenger seat 30. The right airbag 46 receives mainly the right shoulder of the occupant. Further, the tie-panel 52 receives mainly the chest of the occupant. As a result, the passenger-seat airbag 32 protects the occupant from the impact of the frontal collision. In addition, as shown in FIG. 3, immediately after the passenger-seat airbag 32 starts to be deployed, the passenger-seat airbag 32 receives the occupant at a plurality of portions such as the shoulders, and the load applied to the occupant can be dispersed. Accordingly, the load applied to the occupant can be reduced.

Subsequently, the effects of the method of folding the passenger-seat airbag 32 according to the embodiment will be described in detail.

When the passenger-seat airbag 32 is folded according to the above-described folding method, the airbag folded portion 62 is positioned closer to the rear of the vehicle than the slack portion 49 is, when the passenger-seat airbag device 10 is fitted to the instrument panel 12. The airbag folded portion 62 forms the left airbag 44 and the right airbag 46, and occupies a large portion of the passenger-seat airbag 32. Also, the slack portion 49 is made upright along the airbag folded portion 62, and is positioned closer to the front of the vehicle than the airbag folded portion 62 is. The slack portion 49 forms the root portion 48 that connects the root portion of the left airbag 44 (left-airbag root portion) and the root portion of the right airbag 46 (right-airbag root portion).

When the passenger-seat airbag device 10 operates after the airbag folded portion 62 and the slack portion 49 are positioned in the above-described manner, it takes time for the gas to flow into the airbag folded portion 62 that is formed by rolling-up the left and right airbags 44 and 46 twice and accordion-folding the left and right airbags 44 and 46 once, as shown in FIG. 13A. That is, the airbag folded portion 62 is not unfolded easily. Therefore, the gas intensively flows into the slack portion 49, and the slack portion 49 is instantly inflated. The slack portion 49 is upright in the substantially vehicle-height direction, and the gas flows into the slack portion 49 easily. Thus, as shown in FIG. 13B, the slack portion 49 is expanded toward the top of the vehicle (i.e., in the direction shown by an arrow "A" in FIG. 13B). The slack portion 49 contacts the windshield 56, and forms the root portion 48.

Because the root portion 48 is expanded and deployed quickly toward the substantially top of the vehicle, a "wall" sufficiently stretched by the gas is formed in an airbag deployment area at the position close to the front of the vehicle. Then, the airbag folded portion 62 is unfolded by the reaction force from the "wall", and the airbag folded portion 62 is deployed toward the occupant seated at the passenger seat 30 (i.e., in the direction shown by an arrow "B" in FIG. 13C). Thus, the left airbag 44 and the right airbag 46 are formed. That is, the gas is intensively delivered to the slack portion 49 at the extremely early stage of deployment, and the slack portion 49 is expanded in a predetermined direction to form the "wall". The slack portion 49 forms the root portion 48 that supplies the gas to both of the left airbag 44 and the right airbag 46. As a result, the left airbag 44 and the right airbag 46 are extremely stably expanded and deployed toward the passenger seat 30 in the direction shown by the arrow "B". In FIG. 13C, the arrow "B" indicates the trajectory of the movement of the center of the airbag folded portion 62. In FIGS. 15 to 21 as well, the arrow "B" indicates the trajectory of the movement of the center of the airbag folded portion 62.

It has been found that the accuracy of the direction in which the left airbag 44 and the right airbag 46 are deployed is determined by the level of the performance of deploying the root portion 48 that supplies the gas to both of the left airbag 44 and the right airbag 46 in the early stage (i.e., the level of the performance of quickly deploying the root portion, and the level of the performance of deploying the root portion in a predetermined direction). In view of this, the method of folding the passenger-seat airbag in this embodiment is devised. Therefore, the accuracy of the direction in which the passenger-seat airbag 32 is deployed can be improved. In other words, the passenger-seat airbag 32 can be deployed in the intended direction.

Recently, vehicles have been designed such that the angle between the windshield 56 and the top wall portion 12A of the instrument panel 12 is extremely small as compared to conventional vehicles. In such vehicle models, it is very useful to deploy the passenger-seat airbag 32 in a given direction with high accuracy.

Generally, the time required for the gas to reach the end of the rolled-up portion is longer than the time required for the gas to reach the end of the accordion-folded portion. That is, the rolled-up portion is unfolded less easily than the accordion-folded portion.

In the method of folding the passenger-seat airbag according to the embodiment, the slack portion 49 is positioned closer to the front of the vehicle than the airbag folded portion 62 is, and the airbag folded portion 62 is positioned closer to the rear of the vehicle than the slack portion 49 is when the passenger-seat airbag 32 is provided in the vehicle. Therefore, the following effects can be obtained. That is, the gas injected from the inflator 28 is about to flow into the slack portion 49 and the airbag folded portion 62. However, because the airbag folded portion 62 is formed mainly by rolling-up the left and right airbags 44 and 46, the airbag folded portion 62 is unfolded less easily. Therefore, the gas injected from the inflator 28 can be intensively delivered to the slack portion 49. Accordingly, the slack portion 49 can be expanded and deployed instantly. As a result, according to the embodiment, the accuracy of the direction in which the airbag folded portion 62 is deployed can be improved.

In addition, in the method of folding the passenger-seat airbag according to the embodiment, the tip portion 49A of the slack portion 49 is accordion-folded once. Therefore, the slack portion 49 can be expanded and deployed quickly. That is, the slack portion 49 is somewhat long in the lateral view. Therefore, when the slack portion 49 is made upright along the airbag folded portion 62, the tip portion 49A may protrude beyond the airbag folded portion 62. In this case, the slack portion 49 is accordion-folded once (or twice) because the gas flows into the accordion-folded portion easily. Thus, the slack portion 49 is made compact. The slack portion 48 is not rolled-up because the gas flows into the rolled-up portion less easily. As a result, though the slack portion 49 is somewhat long, the slack portion 49 can be expanded and deployed quickly. That is, the expected purpose is achieved.

Further, if the tip portion 49A of the slack portion 49 is accordion-folded toward the front of the vehicle, the slack portion 49 is inflated slowly. Accordingly, it takes much time to fill the space between the top wall portion 12A of the instrument panel 12 and the windshield 56. Meanwhile, if the tip portion 49A of the slack portion 49 is accordion-folded once (or twice) toward the airbag folded portion 62 as in the embodiment, the slack portion 49 can be inflated quickly and the space can be filled quickly.

Further, by changing the methods of folding the slack portion 49 and the airbag folded portion 62, the trajectory of deployment of the passenger-seat airbag 32 (i.e., the direction in which the passenger-seat airbag 32 is deployed) can be arbitrarily selected. Accordingly, the direction in which the passenger-seat airbag 32 is deployed can be adjusted according to the vehicle model so that the optimum trajectory can be obtained.

Figure 14A:
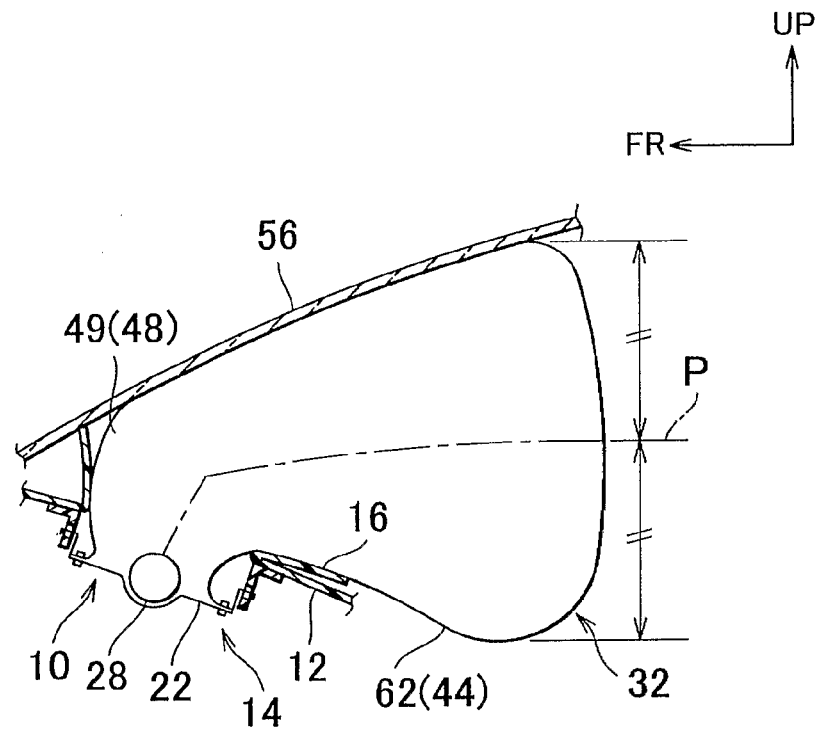
FIGS. 14A and 14B are diagrams explaining one of the effects of the method of folding the passenger-seat airbag according to the embodiment of the invention.

The effects will be described with respect to the drawings. In FIG. 14A, a chain line P indicates the trajectory (movement) of deployment of the center of the passenger-seat airbag 32. The trajectory "P" also indicates the direction in which the passenger-seat airbag 32 is expanded. The trajectory in an interval X in FIG. 14B indicates the effect of the method of folding the slack portion 49 that forms the root portion 48. The trajectory in an interval Y in FIG. 14B indicates the effect of the method of folding the airbag folded portion 62 that forms the left airbag 44 and the right airbag 46. Accordingly, by changing the methods of folding the slack portion 49 and the airbag folded portion 62, it is possible to obtain the trajectory that indicates the combined effect of both of the changed methods.

Figure 14B:
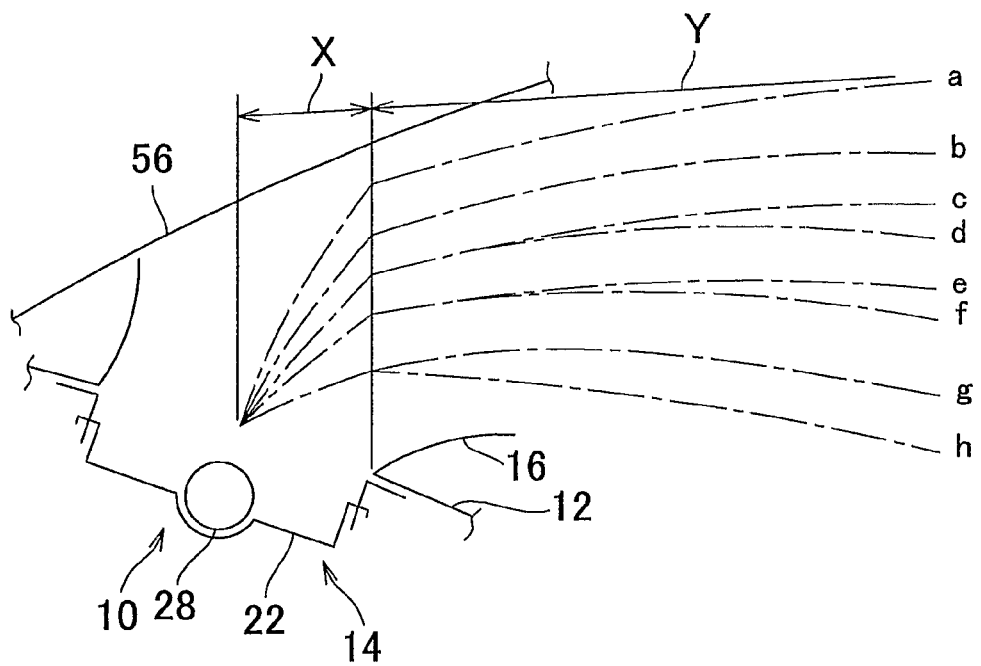

FIG. 14B indicates eight exemplary trajectories "a" to "h". The trajectory "d" is the trajectory of the movement of the passenger-seat airbag 32 when the method of folding the passenger-seat airbag according to the embodiment is employed. By changing the methods of folding the slack portion 49 and the airbag folded portion 62, the trajectory "d" is changed to other trajectories "a" to "h", and "e" to "h". Generally, when the tip portion 49A of the slack portion 49 is bent, the tip portion 49A reaches the windshield 56 more quickly than when the tip portion 49A is folded back. As the number of times, that the airbag folded portion 62 is rolled up increases, the airbag folded portion 62 is unfolded less easily, and the trajectory in the interval "Y" is lower.

IV. Other Embodiments

Modified examples of the method of folding the passenger-seat airbag will be described with reference to the drawings.

In a first modified example shown in FIG. 15, the tip portion 70A of a slack portion 70 is not folded back, and is bent toward the airbag folded portion 72 (i.e., toward the rear of the vehicle) at a substantially right angle. The bent tip portion 70A of the slack portion 70 is positioned above the airbag folded portion 72. Accordingly, as compared to the embodiment in FIG. 13, the root portion 48 reaches the windshield 56 early. The airbag folded portion 72 is formed by rolling up the left and right airbags 44 and 46 once.

In a second modified example shown in FIG. 16 and a third modified example shown in FIG. 17, an airbag folded portion 74 is composed of a lower portion and an upper portion. The lower portion is rolled up once. The upper portion is accordion-folded once. The lower portion is rolled up in the direction opposite to the direction in the first modified example in FIG. 15. In the second modified example, the slack portion 49 is folded back in the manner shown in FIG. 13. In the third modified example, the slack portion 70 is bent in the manner shown in FIG. 15.

In a fourth modified example shown in FIG. 18 and a fifth modified example shown in FIG. 19, an airbag folded portion 76 is formed by rolling up the left and right airbags 44 and 46 three times. In the fourth modified example, the slack portion 49 is folded back. In the fifth modified example, the slack portion 70 is bent. In each of the modified examples, the airbag folded portion is formed by rolling up the left and right airbags 44 and 46 many times, the airbag folded portion is not unfolded easily, and the trajectory "Y" in FIG. 14B is low.

In a sixth modified example in FIG. 20, an airbag folded portion 78 is formed by accordion-folding the left and right airbags 44 and 46 twice. The slack portion 49 of the root portion 48 is folded back. In this example, because the airbag folded portion 78 is formed by accordion-forming the left and right airbags 44 and 46, the airbag folded portion 78 would not be unfolded easily, and the effects of the embodiment would not be obtained easily. However, even though the airbag folded portion 78 is formed by accordion-folding the left and right airbags 44 and 46, the gas can be intensively delivered to the slack portion 49 at the initial stage of deployment, by adjusting the arrangement of the opening portions of the retainer 36, and by adjusting the areas of the opening portions to adjust the flow of the gas. Therefore, the invention can be realized in this modified example.

In a seventh modified example shown in FIG. 21, an airbag folded portion 80 is formed by rolling up the left and right airbags 44 and 46. The left and right airbags 44 and 46 are rolled up in the direction opposite to the direction in the first modified example shown in FIG. 15. The slack portion 49 is folded back in the same manner as in FIG. 13.

V. Supplementary Explanation of the Embodiment

In the above-described embodiment, the invention is applied to the passenger-seat airbag 32 that includes airbag body including the left airbag 44 and the right airbag 46. However, the invention may be applied to a single airbag.

Figure 22:
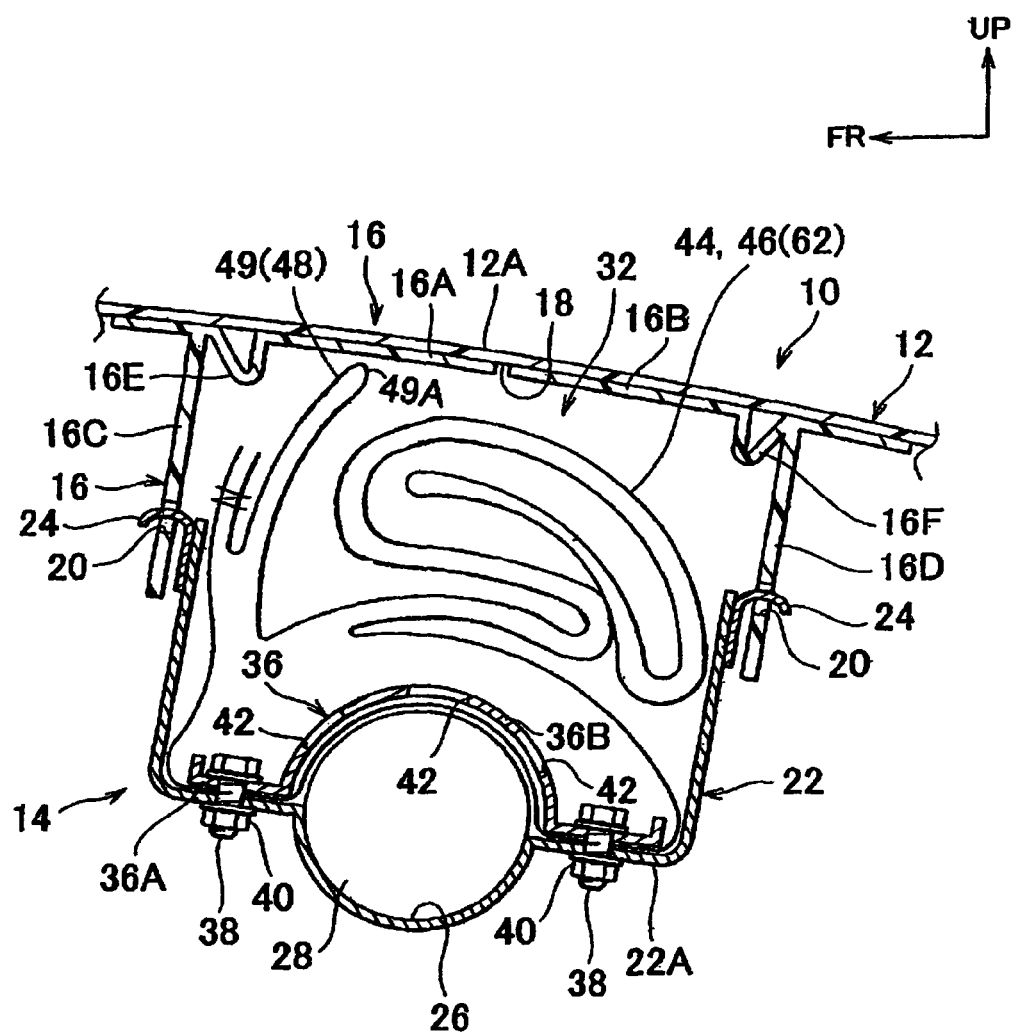
FIG. 22 is a longitudinal cross sectional view showing a passenger-seat airbag device that includes an airbag folded by the method of folding a passenger-seat airbag according to an embodiment of the invention.

As shown in FIG. 22, the invention may be applied to the case where the tip portion 49A of the slack portion 49 that forms the root portion is not bent or folded back. That is, the tip portion 49A of the slack portion 49 that forms the root portion may be oriented toward the top of the vehicle in a substantially upright state. In this case, the slack portion 49 can be expanded and deployed toward the windshield 56 quickly, as compared to the case where the tip portion 49A is bent or folded back.

The distinction between the accordion-folding and the rolling-up will be described. The phrase "the left and right airbags 44 and 46 are accordion-folded" signifies that the left and right airbags 44 and 46 are folded by 180 degrees once in one direction, and then are folded by 180 degrees in the opposite direction. The phrase "the left and right airbags 44 and 46 are rolled-up" signifies that the left and right airbags 44 and 46 are folded by 180 degrees once in one direction, and then are folded by 180 degrees in the same direction.

While the invention has been described with reference to example embodiment thereof, it should be understood that the invention is not limited to the example embodiments or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

The invention claimed is:

1. A method of folding a passenger-seat airbag that includes an airbag body including a left airbag and a right airbag that correspond to left and right shoulders of an occupant seated at a passenger seat; and a root portion that receives gas injected from an inflator when the inflator operates, and that connects a left-airbag root portion and a right-airbag root portion, the method comprising:

folding each of the left and right airbags in a left-and-right direction when the passenger-seat airbag is provided in the vehicle, such that each of the left and right airbags has a strip shape, and then folding the left and right airbags that are overlapped with each other, toward one side in a longitudinal direction to form an airbag folded portion, wherein the left and right airbags are positioned closer to a rear of a vehicle than the root portion is when the passenger-seat airbag is provided in the vehicle; and making the root portion slack to form a slack portion, and making the slack portion upright along the airbag folded portion after the slack portion is extended toward a front of the vehicle, wherein the root portion is positioned closer to the front of the vehicle than the left and right airbags are when the passenger-seat airbag is provided in the vehicle, wherein a tip portion of the slack portion is accordion-folded only once so that the tip portion terminates in a downward direction, perpendicular to a bottom of an airbag case; and wherein when the gas is supplied to the root portion, the slack portion starts to expand and deploy before the airbag folded portion starts to expand and deploy; and the root portion is expanded toward a windshield so that the slack portion is a first portion of the passenger-seat airbag to contact the windshield thereby forming a wall in an airbag deployment area at a position close to the front of the vehicle so that the airbag folded portion receives a reaction force from the wall.

2. The method according to claim 1, wherein surfaces of each of the left and right airbags, which are left and right surfaces of each of the left and right airbags when each of the left and right airbags is deployed in the vehicle, are overlapped with each other so that each of the left and right airbags is flat; a lower portion of each of the left and right airbags, which is a lower one-third portion in a vehicle-height direction when each of the left and right airbags is deployed in the vehicle, is accordion-folded toward a center of each of the left and right airbags; an upper portion of each of the left and right airbags, which is an upper one-third portion in the vehicle-height direction when each of the left and right airbags is deployed in the vehicle, is rolled up toward the center; and the rolled-up upper portion is placed on the accordion-folded lower portion so that each of the left and right airbags has the strip shape.

3. The method according to claim 1, wherein the airbag folded portion is formed mainly by rolling up the airbag body.

4. The method according to claim 1, wherein the airbag folded portion is formed by rolling up an end portion of the airbag body, which is distant from the root portion, twice to form a rolled-up portion, and then accordion-folding another end portion of the airbag body, which is close to the root portion, once to form an accordion-folded portion, and placing the rolled-up portion on the accordion-folded portion.

5. The method according to claim 1, wherein the airbag folded portion is formed by rolling up an end portion of the airbag body, which is distant from the root portion, once to form a rolled-up portion, and then accordion-folding another end portion of the airbag body, which is close to the root portion, once to form an accordion-folded portion, and placing the accordion-folded portion on the rolled-up portion.

6. The method according to claim 1, wherein the airbag folded portion is formed by rolling up the airbag body three times.

7. The method according to claim 1, wherein the airbag folded portion is formed by accordion-folding the airbag body twice.

8. The method according to claim 1, wherein the tip portion of the slack portion that forms the root portion is accordion-folded toward the airbag folded portion.

9. A passenger-seat airbag device, comprising:
the passenger-seat airbag that is folded by the method according to claim 1;
the inflator that injects the gas; and
an airbag case in which the passenger-seat airbag and the inflator are housed.

10. The passenger-seat airbag device according to claim 9, wherein the airbag body includes a left airbag and a right airbag; and
wherein when the passenger-seat airbag is inflated, a substantially center of an inner portion of the left airbag contacts a substantially center of an inner portion of the right airbag.

11. The passenger-seat airbag device according to claim 9, wherein the airbag body includes a left airbag and a right airbag; and
wherein the passenger-seat airbag device further comprises a connection member that connects a rear end of the left airbag with a rear end of the right airbag.

12. A method of folding a passenger-seat airbag that includes an airbag body including a left airbag and a right airbag that correspond to left and right shoulders of an occupant seated in a passenger seat; and a root portion that receives gas injected from an inflator when the inflator operates, and that connects a left-airbag root portion and a right-airbag root portion, the method comprising:
folding each of the left and right airbags in a left-and-right direction when the passenger-seat airbag is provided in the vehicle, such that each of the left and right airbags has a strip shape, and then folding the left and right airbags that are overlapped with each other, toward one side in a longitudinal direction into an airbag case having a front wall proximate to a front of the vehicle to form an airbag folded portion, wherein the left and right airbags are positioned closer to a rear of a vehicle than the root portion is when the passenger-seat airbag is provided in the vehicle; and
making the root portion slack to form a slack portion, and making the slack portion upright along the airbag folded portion after the slack portion is extended toward a front of the vehicle, wherein the root portion is positioned closer to the front of the vehicle than the left and right airbags are when the passenger-seat airbag is provided in the vehicle;
wherein the slack portion includes a tip portion located between the airbag folded portion and a remainder of the slack portion, with the remainder of the slack portion located between the tip portion and the front wall, the tip portion of the slack portion accordion-folded only once; and
wherein when the gas is supplied to the root portion, the slack portion starts to expand and deploy before the airbag folded portion starts to expand and deploy; and the root portion is expanded toward a windshield so that the slack portion is a first portion of the passenger-seat airbag to contact the windshield thereby forming a wall in an airbag deployment area at a position close to the front of the vehicle so that the airbag folded portion receives a reaction force from the wall.

13. A method of folding a passenger-seat airbag that includes an airbag body including a left airbag and a right airbag that correspond to left and right shoulders of an occupant seated at a passenger seat; and a root portion that receives gas injected from an inflator when the inflator operates, and that connects a left-airbag root portion and a right-airbag root portion, the method comprising:
folding each of the left and right airbags in a left-and-right direction when the passenger-seat airbag is provided in the vehicle, such that each of the left and right airbags has a strip shape, and then folding the left and right airbags that are overlapped with each other, toward one side in a longitudinal direction to form an airbag folded portion, wherein the left and right airbags are positioned closer to a rear of a vehicle than the root portion is when the passenger-seat airbag is provided in the vehicle; and
making the root portion slack to form a slack portion, and making the slack portion upright along the airbag folded portion after the slack portion is extended toward a front of the vehicle, wherein the root portion is positioned closer to the front of the vehicle than the left and right airbags are when the passenger-seat airbag is provided in the vehicle, and wherein a tip portion of the slack portion that forms the root portion is bent toward the airbag folded portion at a substantially right angle; and
wherein when the gas is supplied to the root portion, the slack portion starts to expand and deploy before the airbag folded portion starts to expand and deploy; and the root portion is expanded toward a windshield so that the slack portion is a first portion of the passenger-seat airbag to contact the windshield thereby forming a wall in an airbag deployment area at a position close to the front of the vehicle so that the airbag folded portion receives a reaction force from the wall.

14. The method according to claim 13, wherein the tip portion of the slack portion is positioned above the airbag folded portion.

15. A method of folding a passenger-seat airbag that includes an airbag body including a left airbag and a right airbag that correspond to left and right shoulders of an occupant seated at a passenger seat; and a root portion that receives gas injected from an inflator when the inflator operates, and that connects a left-airbag root portion and a right-airbag root portion, the method comprising:

folding each of the left and right airbags in a left-and-right direction when the passenger-seat airbag is provided in the vehicle, such that each of the left and right airbags has a strip shape, and then folding the left and right airbags that are overlapped with each other, toward one side in a longitudinal direction to form an airbag folded portion, wherein the left and right airbags are positioned closer to a rear of a vehicle than the root portion is when the passenger-seat airbag is provided in the vehicle; and making the root portion slack to form a slack portion, and making the slack portion upright along the airbag folded portion after the slack portion is extended toward a front of the vehicle, wherein the root portion is positioned closer to the front of the vehicle than the left and right airbags are when the passenger-seat airbag is provided in the vehicle, and wherein a tip portion of the slack portion that forms the root portion is oriented toward a top of the vehicle such that the tip portion is in a substantially upright state; and wherein when the gas is supplied to the root portion, the slack portion starts to expand and deploy before the airbag folded portion starts to expand and deploy; and the root portion is expanded toward a windshield so that the slack portion is a first portion of the passenger-seat airbag to contact the windshield thereby forming a wall in an airbag deployment area at a position close to the front of the vehicle so that the airbag folded portion receives a reaction force from the wall.

* * * * *